(12) United States Patent
Groves et al.

(10) Patent No.: US 11,746,817 B2
(45) Date of Patent: Sep. 5, 2023

(54) CARTRIDGE RETENTION AND REMOVAL MECHANISM

(71) Applicant: Kohler Mira Limited, Cheltenham (GB)

(72) Inventors: Sophie Emily Groves, Gloucestershire (GB); Benjamin Lea, Gloucestershire (GB)

(73) Assignee: KOHLER MIRA LIMITED, Cheltenham (GB)

( * ) Notice: Subject to any disclaimer, the term of this patent is extended or adjusted under 35 U.S.C. 154(b) by 793 days.

(21) Appl. No.: 16/867,367

(22) Filed: May 5, 2020

(65) Prior Publication Data
US 2020/0263721 A1    Aug. 20, 2020

Related U.S. Application Data

(63) Continuation of application No. PCT/GB2018/052904, filed on Oct. 11, 2018.

(30) Foreign Application Priority Data

Nov. 8, 2017 (GB) ..................................... 1718440

(51) Int. Cl.
*F16B 21/18* (2006.01)
*F16B 1/00* (2006.01)
(Continued)

(52) U.S. Cl.
CPC .......... *F16B 21/186* (2013.01); *F16B 1/0071* (2013.01); *F16B 21/04* (2013.01); *F16K 27/00* (2013.01)

(58) Field of Classification Search
CPC .. F16B 21/18; F16B 21/186; F16K 2200/501; F16K 19/006; Y10T 137/7668
See application file for complete search history.

(56) References Cited

U.S. PATENT DOCUMENTS 3,807,885 A    4/1974  Coski
5,518,332 A *  5/1996  Katoh ..................... F16C 1/108
                                                     285/305
(Continued)

FOREIGN PATENT DOCUMENTS

CA    2725733 A1 *  6/2012   ............. E03C 1/023
CH    703427 A1    1/2012
(Continued)

OTHER PUBLICATIONS

International Search Report and Written Opinion, PCT/GB2018/052904, Kohler Mira Limited (dated Jan. 21, 2019).
(Continued)

*Primary Examiner* — Jonathan P Masinick
(74) *Attorney, Agent, or Firm* — Husch Blackwell LLP

(57) ABSTRACT

A retaining means for retaining a cartridge on a body includes a snap ring having an opening angle of between 130° and 300°, and comprising a first indexing means, the snap ring being arranged to be slideable between a first position with respect to the body in which the retaining means retains the cartridge on the body and a second position with respect to the body in which the cartridge can be removed from the body. The retaining means also includes a cap arranged to be fixedly connected to a housing of the cartridge, and comprising a second indexing means. The first indexing means is arranged to interlock with the second indexing means so as to allow the snap ring to be moved between, and held in each of, the first and second positions.

19 Claims, 18 Drawing Sheets

(51) Int. Cl.
*F16B 21/04* (2006.01)
*F16K 27/00* (2006.01)

(56) References Cited

U.S. PATENT DOCUMENTS

| | | | | |
|---|---|---|---|---|
| 8,919,707 | B2* | 12/2014 | Lee | H02G 3/30 |
| | | | | 248/74.1 |
| 9,840,307 | B2* | 12/2017 | Rosati | F16B 21/18 |
| 2009/0001310 | A1 | 1/2009 | Hanson | |
| 2010/0206955 | A1 | 8/2010 | Jager | |
| 2011/0126919 | A1* | 6/2011 | Izzy | F16K 19/006 |
| | | | | 137/606 |
| 2014/0299809 | A1 | 10/2014 | Morris et al. | |
| 2015/0104245 | A1* | 4/2015 | Anetzberger | F16D 1/06 |
| | | | | 403/326 |
| 2015/0185738 | A1 | 7/2015 | Qiu et al. | |
| 2016/0245250 | A1 | 8/2016 | Noguchi | |
| 2016/0310873 | A1 | 10/2016 | Wong | |
| 2017/0211721 | A1 | 7/2017 | Ritter et al. | |
| 2021/0091486 | A1* | 3/2021 | Vuillardot | F16B 21/186 |

FOREIGN PATENT DOCUMENTS

| | | | |
|---|---|---|---|
| DE | 10 2004 027 041 A1 | 12/2005 | |
| DE | 102007030152 A1 * | 1/2009 | ........... E03C 1/0401 |
| DE | 102015205968 A1 * | 10/2016 | |
| FR | 2625264 A1 | 6/1989 | |
| WO | WO-2009/058520 A2 | 5/2009 | |
| WO | WO-2016080933 A1 * | 5/2016 | ............. E05B 63/00 |
| WO | WO-2016/207531 A1 | 12/2016 | |
| WO | WO-2017095218 A1 * | 6/2017 | ............. E04B 1/585 |

OTHER PUBLICATIONS

UKIPO Search Report, App. No. 1718440.9, Kohler Mira Limited (dated Apr. 30, 2018).

* cited by examiner

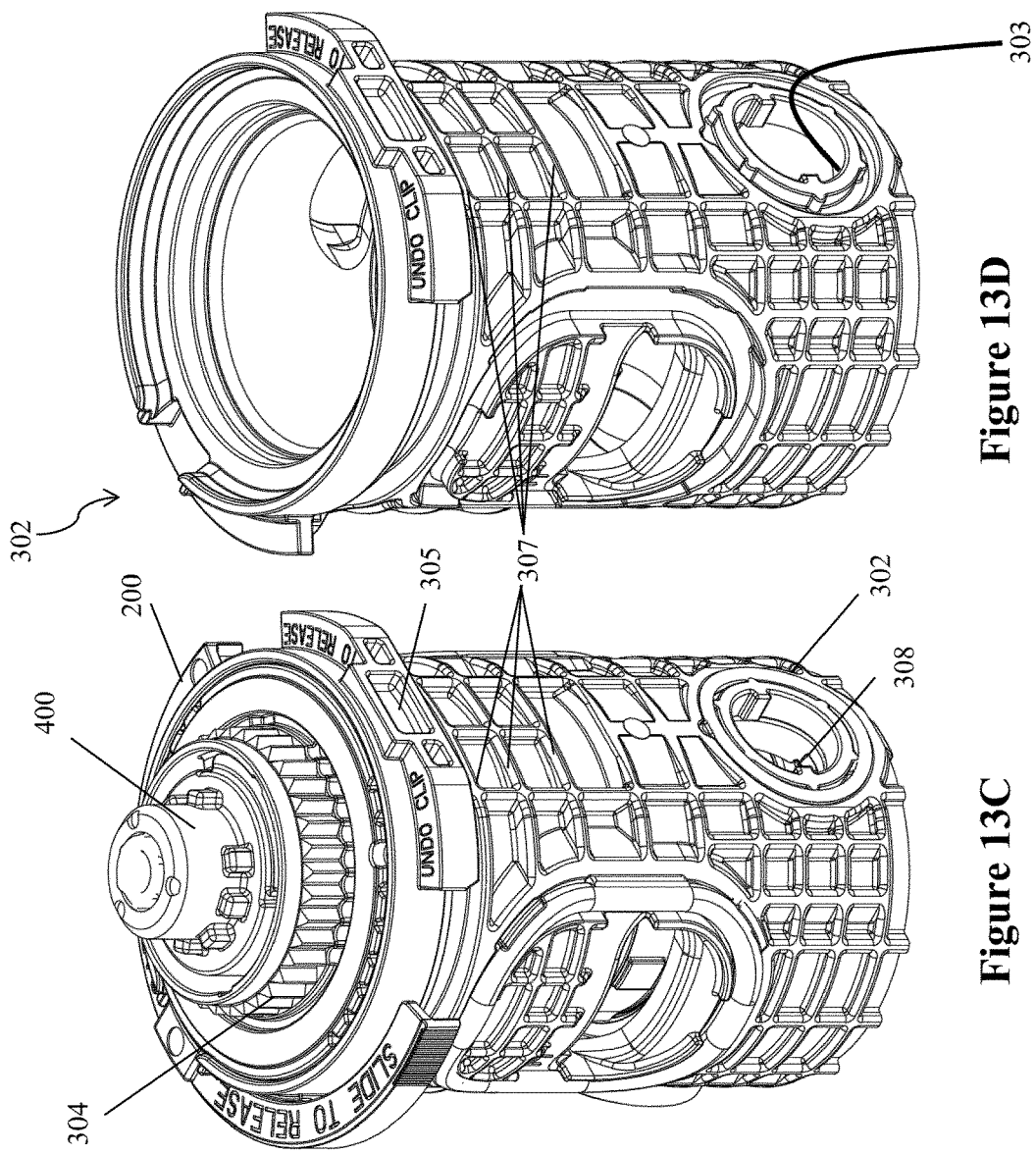
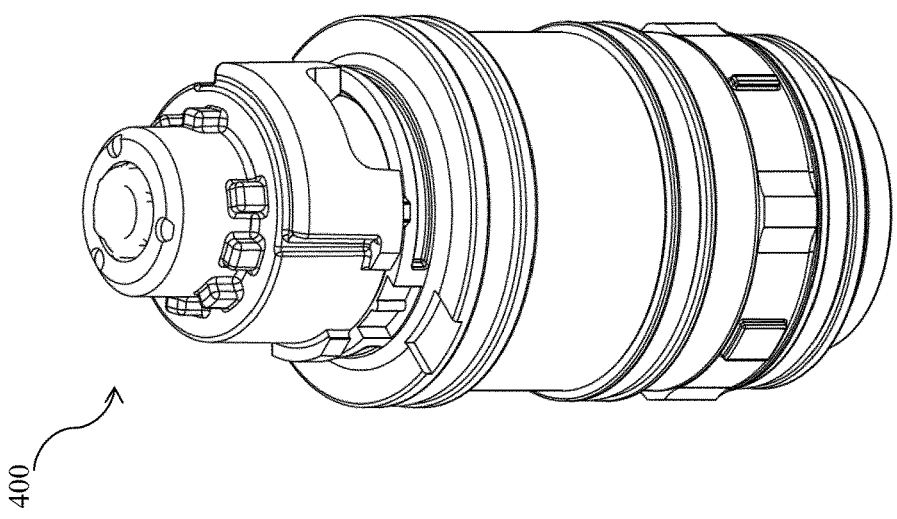
Figure 13B
Figure 13C
Figure 13D

CARTRIDGE RETENTION AND REMOVAL MECHANISM

CROSS-REFERENCE TO RELATED PATENT APPLICATIONS

This application is a Continuation of International Patent Application No. PCT/GB2018/052904, filed Oct. 11, 2018, which claims the benefit of and priority to United Kingdom Patent Application No. 1718440.9, filed Nov. 8, 2017. The entire disclosures of International Patent Application No. PCT/GB2018/052904 and United Kingdom Patent Application No. 1718440.9, including their specifications, drawings, claims and abstracts, are incorporated herein by reference in their entireties.

BACKGROUND

The present application relates to a retaining means for retaining a cartridge within a body of a tap, shower control, or the like. In particular, the present application relates to use of a snap ring for ease of retention and removal of the cartridge.

In the prior art, nuts, e.g. headnuts, are often used to secure cartridge assemblies within tap bodies. Use of a spanner is required to loosen and tighten the headnut, which can be inconvenient if a person intending to service the cartridge does not have an appropriate tool. Prior art documents such as United States patent document US 2014/299809 disclose that standard fastening clips such as circlips may be used in place of a headnut, but these clips can easily be lost or forgotten during installation, and can be fiddly to fit.

SUMMARY

An exemplary embodiment relates to a retaining means for retaining a cartridge on a body. The retaining means includes a snap ring having an opening angle of between 130° and 300°, and comprising a first indexing means, the snap ring being arranged to be slideable between a first position with respect to the body in which the retaining means retains the cartridge on the body and a second position with respect to the body in which the cartridge can be removed from the body. The retaining means also includes a cap arranged to be fixedly connected to a housing of the cartridge, and comprising a second indexing means. The first indexing means is arranged to interlock with the second indexing means so as to allow the snap ring to be moved between, and held in each of, the first and second positions.

Another exemplary embodiment relates to a valve cartridge assembly that includes a cartridge and a retaining means retaining the cartridge to a body. The retaining means includes a snap ring having an opening angle of between 130° and 300°, and comprising a first indexing means, the snap ring being arranged to be slideable between a first position with respect to the body in which the retaining means retains the cartridge on the body and a second position with respect to the body in which the cartridge can be removed from the body. The retaining means also includes a cap arranged to be fixedly connected to a housing of the cartridge, and comprising a second indexing means. The first indexing means is arranged to interlock with the second indexing means so as to allow the snap ring to be moved between, and held in each of, the first and second positions.

Another exemplary embodiment relates to a faucet that includes a faucet body and at least one valve cartridge assembly comprising a cartridge and a retaining means retaining the cartridge to the faucet body. The retaining means includes a snap ring having an opening angle of between 130° and 300°, and comprising a first indexing means, the snap ring being arranged to be slideable between a first position with respect to the body in which the retaining means retains the cartridge on the body and a second position with respect to the body in which the cartridge can be removed from the body. The retaining means also includes a cap arranged to be fixedly connected to a housing of the cartridge, and comprising a second indexing means. The first indexing means is arranged to interlock with the second indexing means so as to allow the snap ring to be moved between, and held in each of, the first and second positions.

BRIEF DESCRIPTION OF THE DRAWINGS

There now follows by way of example only a detailed description of embodiments with reference to the accompanying drawings in which:

FIG. 13B shows the cartridge shown in FIG. 13A;

FIG. 13C shows the cartridge assembly shown in FIG. 13A;

FIG. 13D shows the cartridge housing shown in FIGS. 13A and 13C;

In the Figures, like reference numerals are used for like components.

DETAILED DESCRIPTION

Figure 1A:
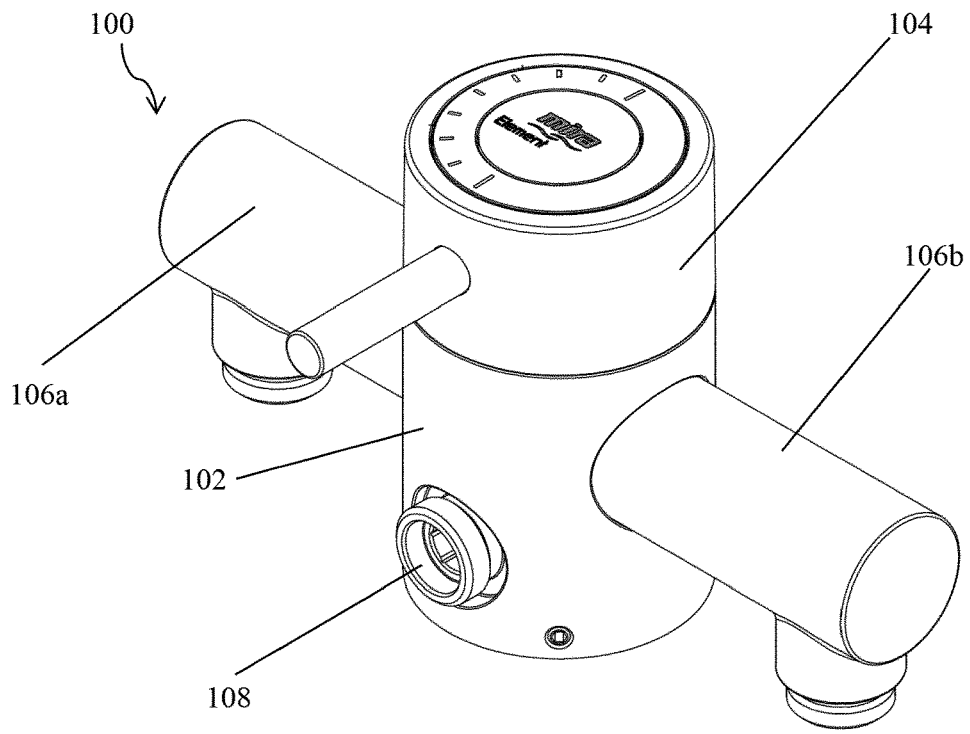
FIG. 1A shows a portion of a mixer tap in accordance with an exemplary embodiment (spout not shown)

According to a first exemplary embodiment, there is provided a retaining means for retaining a cartridge on a body. The retaining means is arranged to be slideable between a first position with respect to the body in which the retaining means retains the cartridge on the body and a second position with respect to the body in which the cartridge can be removed from the body. The retaining means comprises a snap ring having an opening angle of between 130° and 300°; and a first indexing means arranged to allow the snap ring to be moved between, and held in each of, the first and second positions.

The snap ring may have a curved shape so as to form an arc of a circle.

The snap ring may have an opening angle of between 145° and 280°, and optionally between 150° and 160°, and further optionally of around 156°.

The snap ring may be held on the cartridge assembly in both the first position and the second position. Each end region of the snap ring may be biased towards the cartridge assembly. The snap ring may be held onto the cartridge assembly by the end regions of the snap ring in both the first position and the second position.

The cartridge assembly may be arranged to contain a cartridge; the cartridge may be considered to be a part of the cartridge assembly. The cartridge assembly may comprise a cartridge housing which may be arranged to hold or contain the cartridge. The cartridge housing may cooperate with the snap ring so as to retain the cartridge on the body and may therefore be considered to be a part of the retaining means.

The opening angle of the snap ring may be less than 180°.

In embodiments in which the snap ring is held on the cartridge assembly in both the first position and the second position, the cartridge assembly may comprise a cartridge housing which may be thought of as a part of the retaining means. The cartridge housing may comprise a second indexing means. The first indexing means may be arranged to interlock with the second indexing means so as to allow the snap ring to be held in, and moved between, the first and second positions.

In embodiments with a second indexing means, the first and second indexing means may comprise: (i) a protrusion; and (ii) a groove arranged to receive the protrusion, the groove having a narrower central segment and wider end segments, the grove being oriented radially with respect to the body.

In such embodiments, the snap ring may be in the first position when the protrusion is in a first end segment of the end segments, and in the second position when the protrusion is in a second end segment of the end segments.

In such embodiments: (i) the protrusion may be provided by the cartridge housing and the groove may be provided by the snap ring; or (ii) the protrusion may be provided by the snap ring and the groove may be provided by the cartridge housing.

In embodiments with a groove, the groove may be arranged to bias the protrusion towards the nearest end segment.

The opening angle may be more than 180°.

In embodiments with a cartridge housing, the cartridge housing may comprise a cap fixedly connected to the body of the cartridge housing, and the snap ring may be held to the cap.

The first indexing means may be arranged to interengage with a second indexing means provided by the body. The first indexing means may be arranged to interengage with one or more lugs of the body so as to provide the indexing between the first and second positions.

The snap ring may have lugs arranged to cooperate with lugs on the body such that in the first position the lugs on the snap ring engage the lugs on the body, and, when the snap ring is slid to the second position, the lugs of the snap ring release from the lugs on the body.

The snap ring may be arranged to slide in a radial direction between the first position and the second position.

End regions of the snap ring may have grips provided on their outer surfaces. The grips may be arranged to facilitate manual sliding of the snap ring between the first and second positions.

The snap ring may comprise: a first elongate surface forming an arc of the snap ring; a second elongate surface extending along a first side of the first elongate surface and optionally at least substantially perpendicular thereto such that the first and second elongate surfaces form a shape at least substantially L-shaped in cross-section; and one or more lugs extending from a second side of the first elongate surface and optionally at least substantially perpendicular thereto, and optionally at least substantially parallel to the second elongate surface, wherein the one or more lugs of the snap ring are arranged to engagingly interact with the lugs on the body in the first position, and to be free of the lugs of the body in the second position.

In such embodiments, the lugs may be provided by a third elongate surface extending along the second side of the first elongate surface and at least substantially perpendicular thereto, and at least substantially parallel to the second elongate surface. The third elongate surface may narrow in width towards the ends of the snap ring, optionally such that the snap-ring is substantially U-shaped in cross-section away from the ends of the snap ring and substantially L-shaped in cross-section towards the ends of the snap ring.

Optionally, (i) the width of the third elongate surface may narrow in discrete steps; and/or (ii) the width of the third elongate surface may narrow smoothly.

According to a second exemplary embodiment, there is provided a valve cartridge assembly comprising a retaining means according to the first embodiment; and a cartridge; wherein the cartridge is arranged to be held to a body by the retaining means.

According to a third exemplary embodiment, there is provided a tap comprising at least one valve cartridge assembly according to the second embodiment, and wherein the body is a tap body.

According to a fourth exemplary embodiment, there is provided a shower comprising at least one valve cartridge assembly according to the second embodiment, and wherein the body is a shower control body.

The skilled person would understand that features described with respect to one embodiment may be applied, mutatis mutandis, to any other embodiment.

Turning now to the accompanying drawings, FIG. 1A shows a portion 100 of a mixer tap, the portion 100 comprising a tap body 102, handle 104, and hot and cold water inlets 106a, 106b.

The spout is not shown, but would extend from outlet 108 when connected. The skilled person will appreciate that a shower hose or the like could be connected to the outlet 108 in alternative embodiments.

In the embodiment shown, the tap body 102 is substantially cylindrical. The handle 104 comprises a cylindrical portion extending from the top of the tap body 102 and a lever extending perpendicular to the axis of the tap body. The hot and cold water inlets 106a, 106b take the form of pipes on opposite sides of the body 102. The skilled person will appreciate that parts of the tap 100 may take other shapes in other embodiments, and that the embodiment shown is used by way of example only.

Movement of the handle 104, in this case rotation, is arranged to adjust temperature of water passing through the outlet 108 by adjusting the ratio of hot and cold water from the hot and cold water inlets 106a, 106b.

In the embodiment being described, the cylindrical portion of the handle 104 is hollow. Handle drive and bearing components 110, 112, 114 are located at least partially within the handle 104 in this embodiment. The skilled person will appreciate that the handle drive and bearing components 110, 112, 114 may take any suitable form as known in the art, and may be contained within the tap body 102 and not within the handle 104, or partly within each, in other embodiments. In the embodiment being described, the handle drive and bearing components comprise:

(a) a handle drive 110 which is arranged to provide an interface between the handle 104 and the cartridge 400, which in this case is a thermostatic cartridge;

(b) a control bearing 112 which is arranged to provide a bearing surface for the handle 104. The upstand interlocks with the handle trims to ensure that they remain stationary and upright even when the handle 104 is turned; and (c) a temperature stop 114 which is arranged to provide a stop for the handle 104, ensuring that the maximum set temperature is not exceeded. This can be adjusted to change the maximum set temperature.

In the embodiment being described, the handle drive and bearing components 110, 112, 114 are arranged to control a cartridge, in this case a thermostatic cartridge 400.

In alternative or additional embodiments, the cartridge may be a flow cartridge, diverter cartridge, or manual temperature cartridge.

In the embodiment being described, the cartridge 400 is located axially with respect to the body and arranged to be actuated by movement of the handle 104, via the handle drive and bearing components 110, 112, 114.

A retaining means is provided to releasably retain the cartridge 400 on or within the body 102. The skilled person will appreciate that the cartridge 400 may be partially or wholly within the body 102, and partially or wholly within the handle 104. In any case, the cartridge 400 is held to/retained on the body 102 in some way, whether or not the cartridge 400 is partially or wholly within the body 102.

The cartridge 400 may be thought of as part of a cartridge assembly 400, 302, 304. In the embodiment being described, the cartridge assembly 400, 302, 304 comprises a cartridge housing 302 and a cap 304 in addition to the cartridge 400.

In the embodiment being described, a welded base cap 310 is also provided, within the cartridge housing 302 and beneath the cartridge 400.

In the embodiment being described, the cartridge housing 302 is a standard cartridge housing 302 generally sold with, or for use with, the cartridge 400. The cartridge 400 is retained by the cartridge housing 302.

The cap 304 is arranged to be fixedly connected to the cartridge housing 302, and is rigidly connected in the embodiment being described, in particular by welding. The cap 304 may therefore be described as a welded cap 304 in the embodiment being described. The skilled person will appreciate that any fixing method known in the art could be used to hold the cap 304 in place (i.e. to the cartridge housing 302), for example it could be screwed, clipped, or glued in addition to or instead of welding.

The cartridge assembly 400 is arranged to be removably held to the body 102 by a snap ring 200. The snap ring 200 is made of a resiliently deformable material.

The snap ring 200 is arranged to be slideable between a first position in which the retaining means retains the cartridge 400 on the body 102 and a second position with respect to the body 102 in which the cartridge 400 can be removed from the body 102.

In the embodiment being described, the snap ring 200 is slidably mounted on the cartridge assembly, and in particular on the cap 304. In alternative or additional embodiments, the snap ring 200 may be slidably mounted on the body 102, or on a different part of the cartridge assembly.

In the first position, in the embodiment being described, the snap ring 200 is arranged to fit within the handle 104 such that it is not visible in use.

In the embodiment being described, the handle 104 and body 102 are circular in cross-section and have the same diameter, and the snap ring 200 is shaped to match their curvature in the first position. In the embodiment being described, the snap ring 200 therefore takes the form of an arc of a circle with a smaller external diameter than that of the handle 104 and body 102.

In the embodiment being described, the snap ring 200 has one or more lugs 208 which are arranged to engage one or more lugs 102a on the body 102 in the first position, and to move out of engagement with the lugs 102a on the body 102 when moved into the second position. In the second position, the cartridge assembly 400, 302, 304 can therefore be separated from the body 102 when the snap ring 200 is in the second position.

Figure 18:
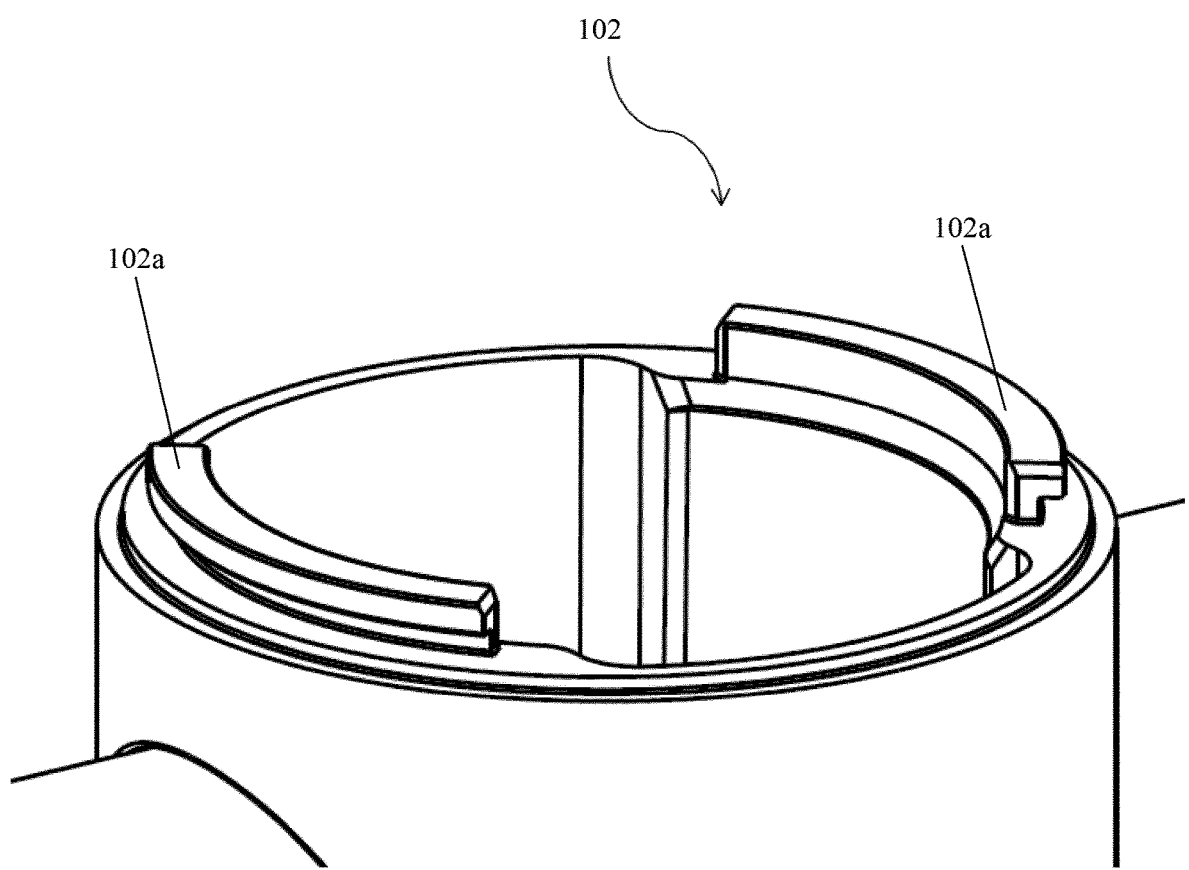
FIG. 18 shows a close-up of the portion of the tap body arranged to be gripped by the snap ring in use.

As can be seen from FIG. 18, the lugs 102a are symmetrical on the body 102 in the embodiment being described. The skilled person will appreciate that, as a result, the cartridge assembly can be inserted and held in place in two different positions, one at 180° to the second.

Figure 13A:
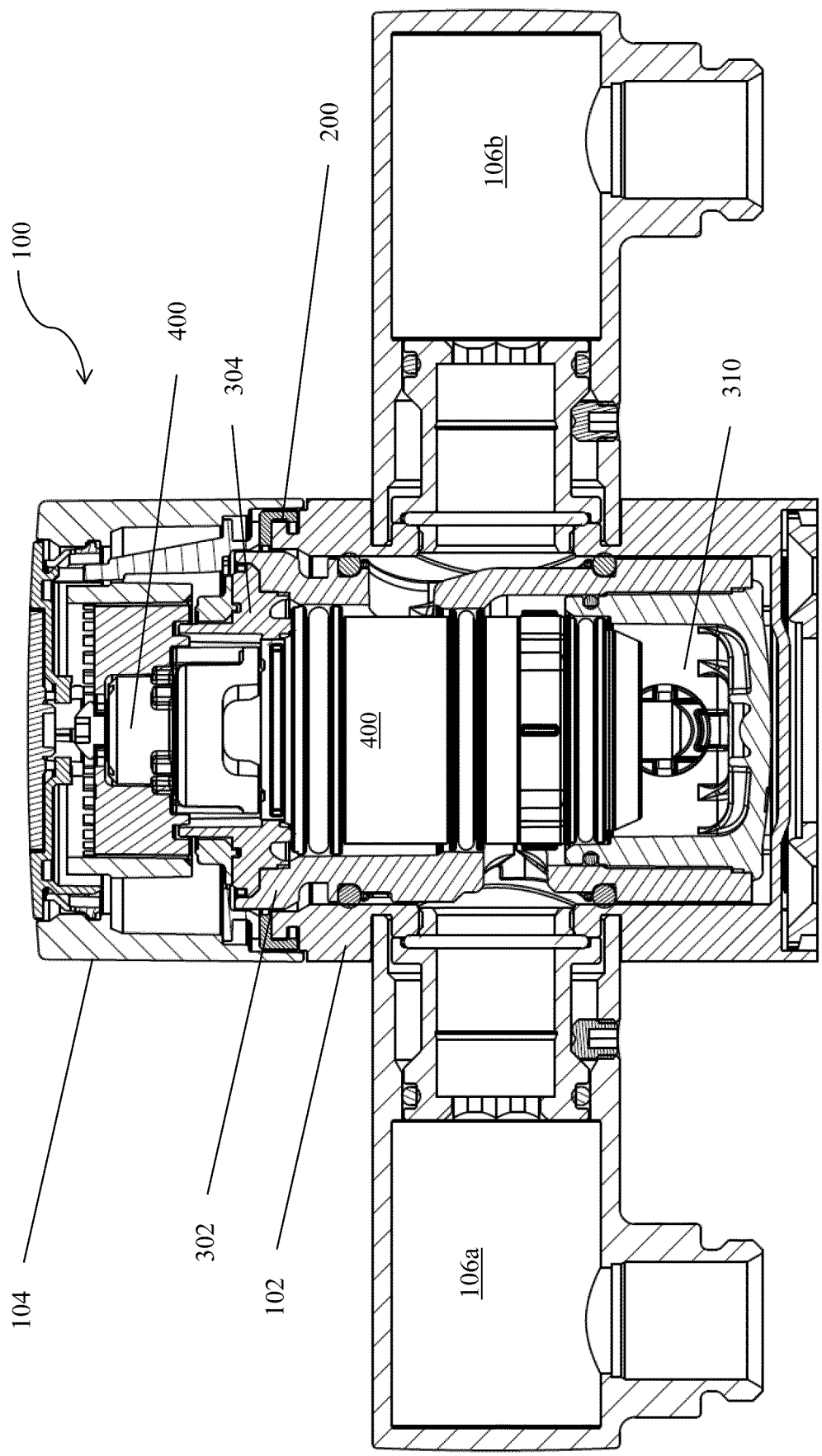
FIG. 13A shows a cross-sectional view of the portion of a mixer tap shown in the preceding Figures.

As can be seen from FIG. 13C and FIG. 13D, the cartridge housing 302 has a hole 303 therethrough arranged to connect to the outlet 108 through the body 102. In the embodiment being described, the cartridge housing has a second hole opposite the hole 303 such that the cartridge 400 can be linked to the outlet 108 in either orientation. In the embodiment being described, a plug is provided to block the unused hole 303.

Figure 4:
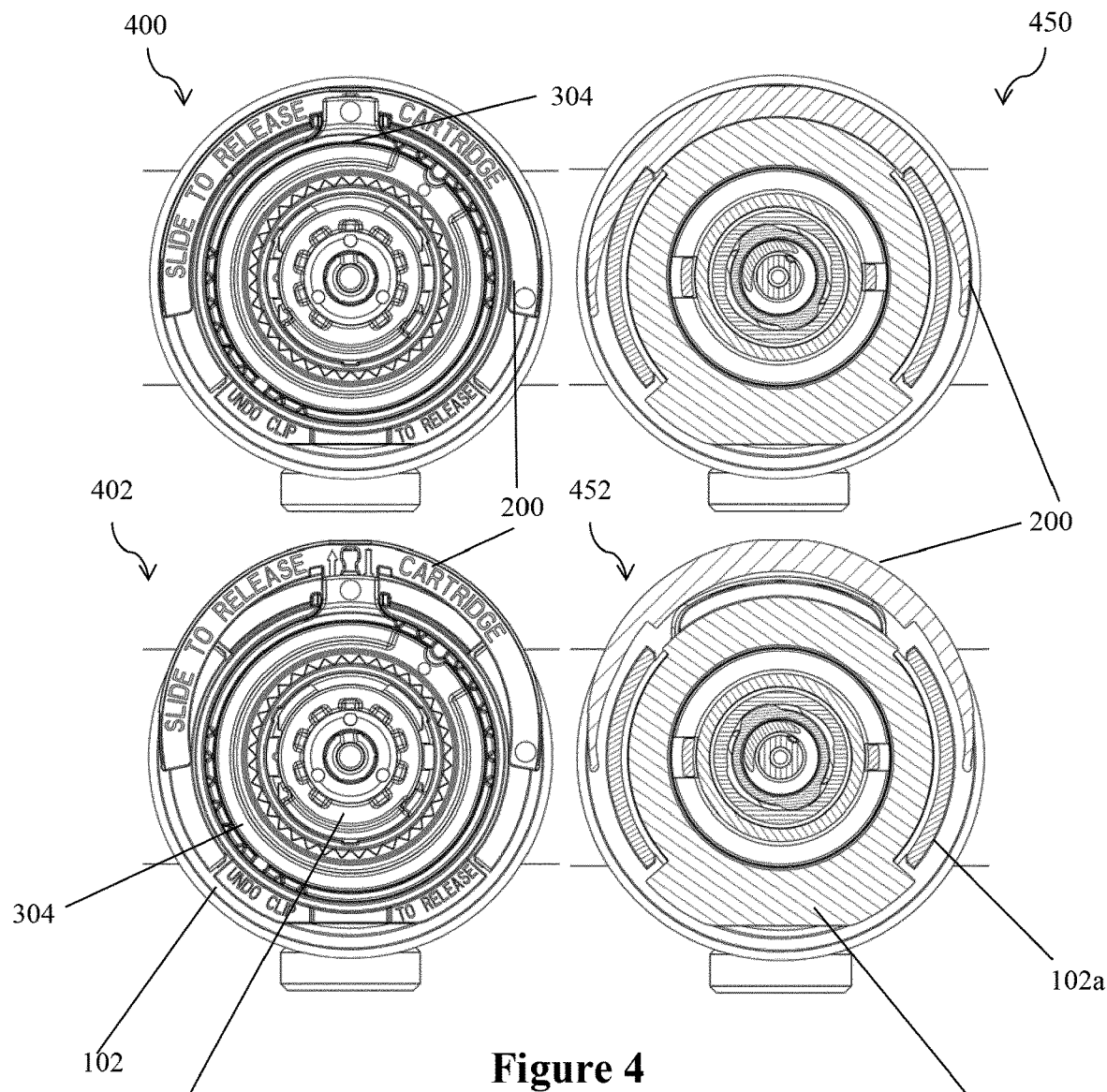
FIG. 4 shows plan and cross-sectional views of the cartridge assembly, snap ring and tap body in retained and released positions.
Figure 5:
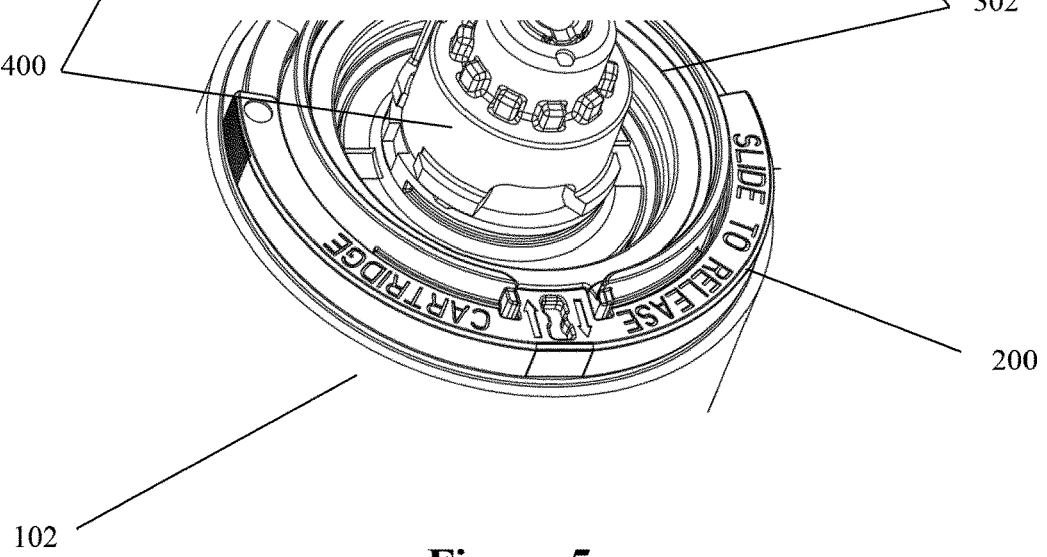
FIG. 5 shows an enlarged view of the indexing means of the snap ring of an exemplary embodiment.

FIG. 4 shows plan 400, 402 and underneath 450, 452 views of the tap portion 100 with the snap ring 200 in the first position 400, 450 and in the second position 402, 452.

In the first position 400, 450, the snap ring 200 is closer to the cartridge housing 302 and the lugs 208 engage the lugs 102a on the body 102.

In the second position 402, 452, the snap ring 200 is further from the cartridge housing 302 and the lugs 208 are free of the lugs 102a on the body 102. More of the cartridge housing 302 can be seen in the Figures as a result.

Figure 1B:
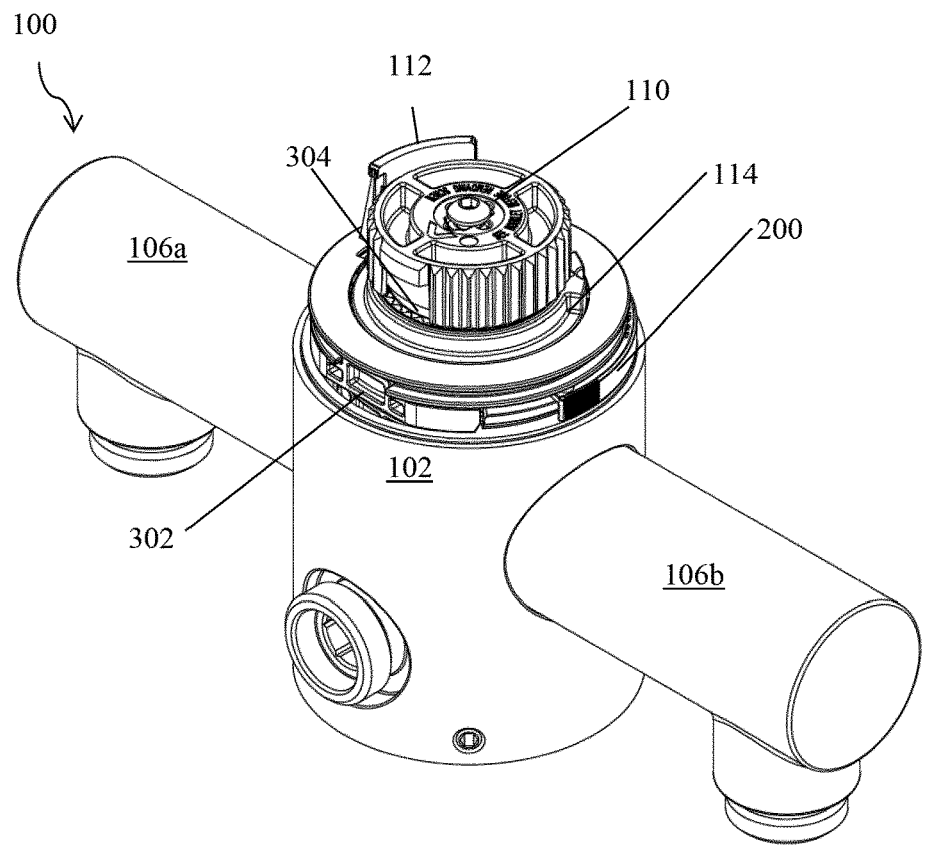
FIG. 1B shows the portion of a mixer tap of FIG. 1A with the handle components removed to expose the drive mechanism.
Figure 1C:
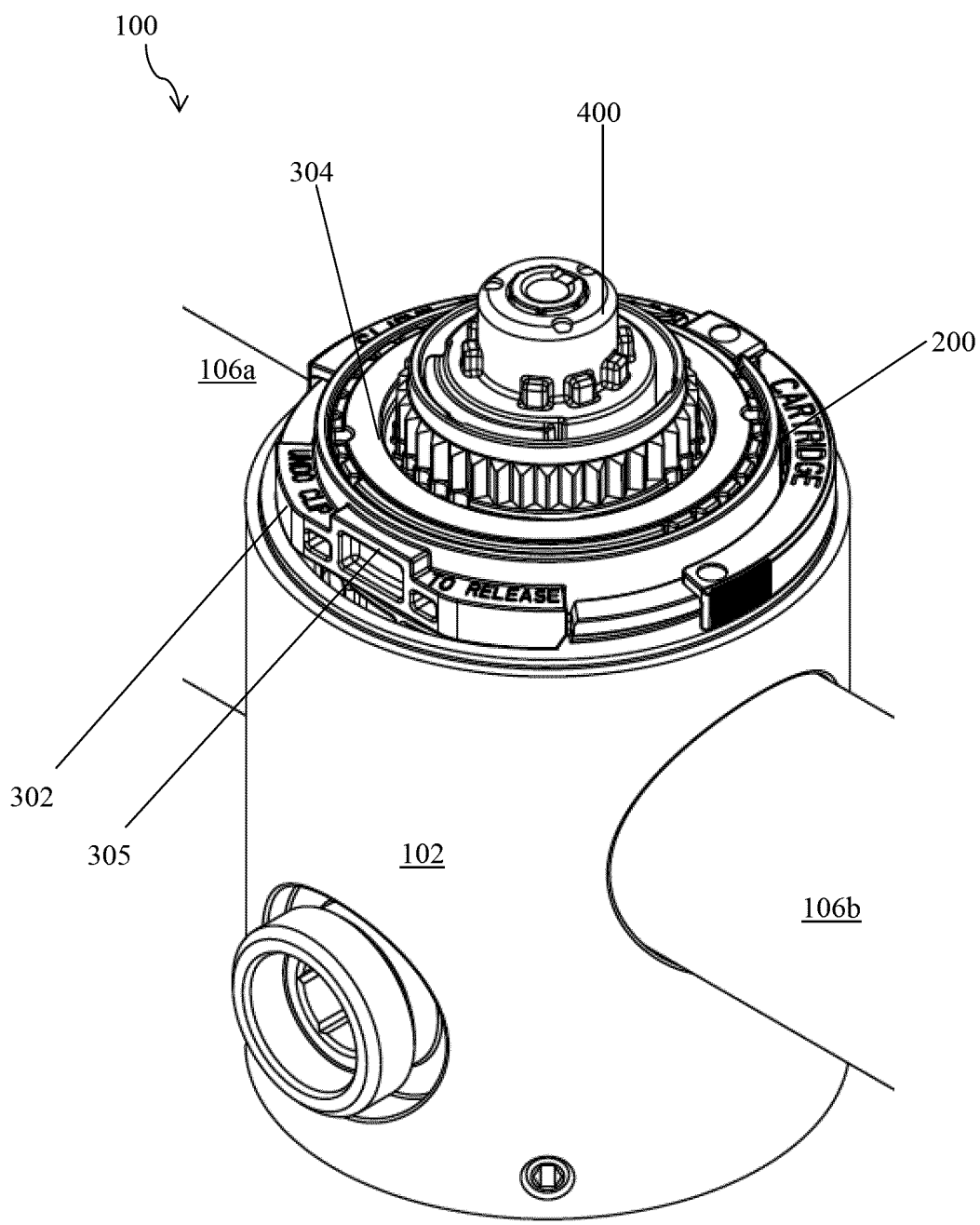
FIG. 1C shows the portion of a mixer tap of FIGS. 1A and 1B with the handle components and drive mechanism removed to expose the cartridge assembly.
Figure 2A:
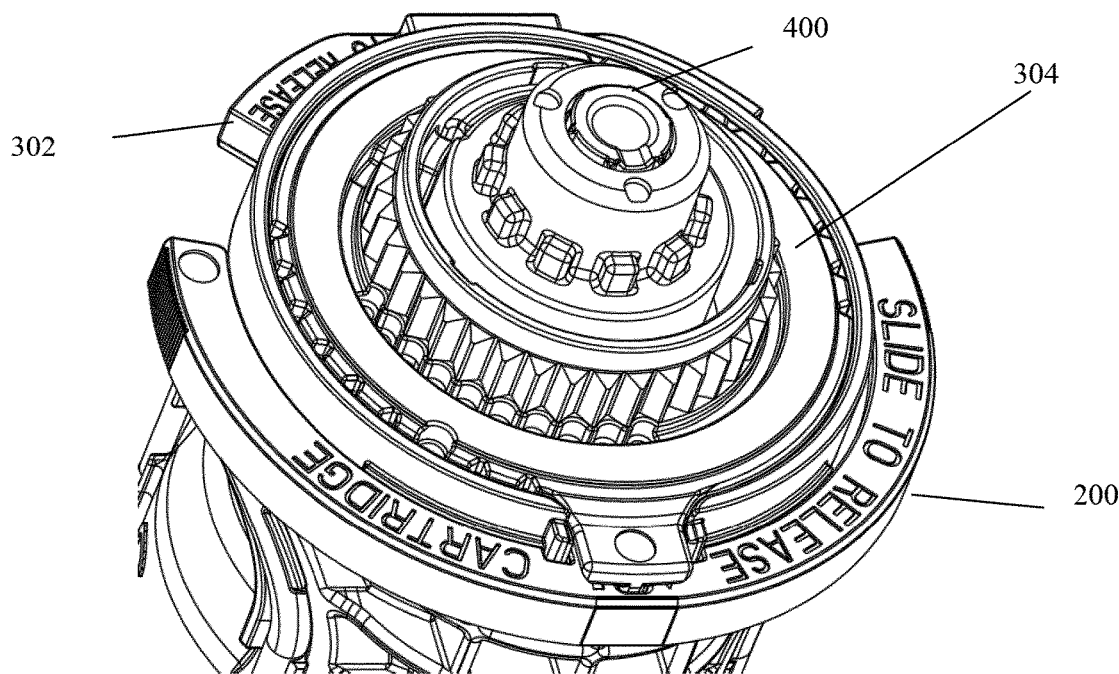
FIG. 2A shows the cartridge assembly separate from the tap body.
Figure 2B:
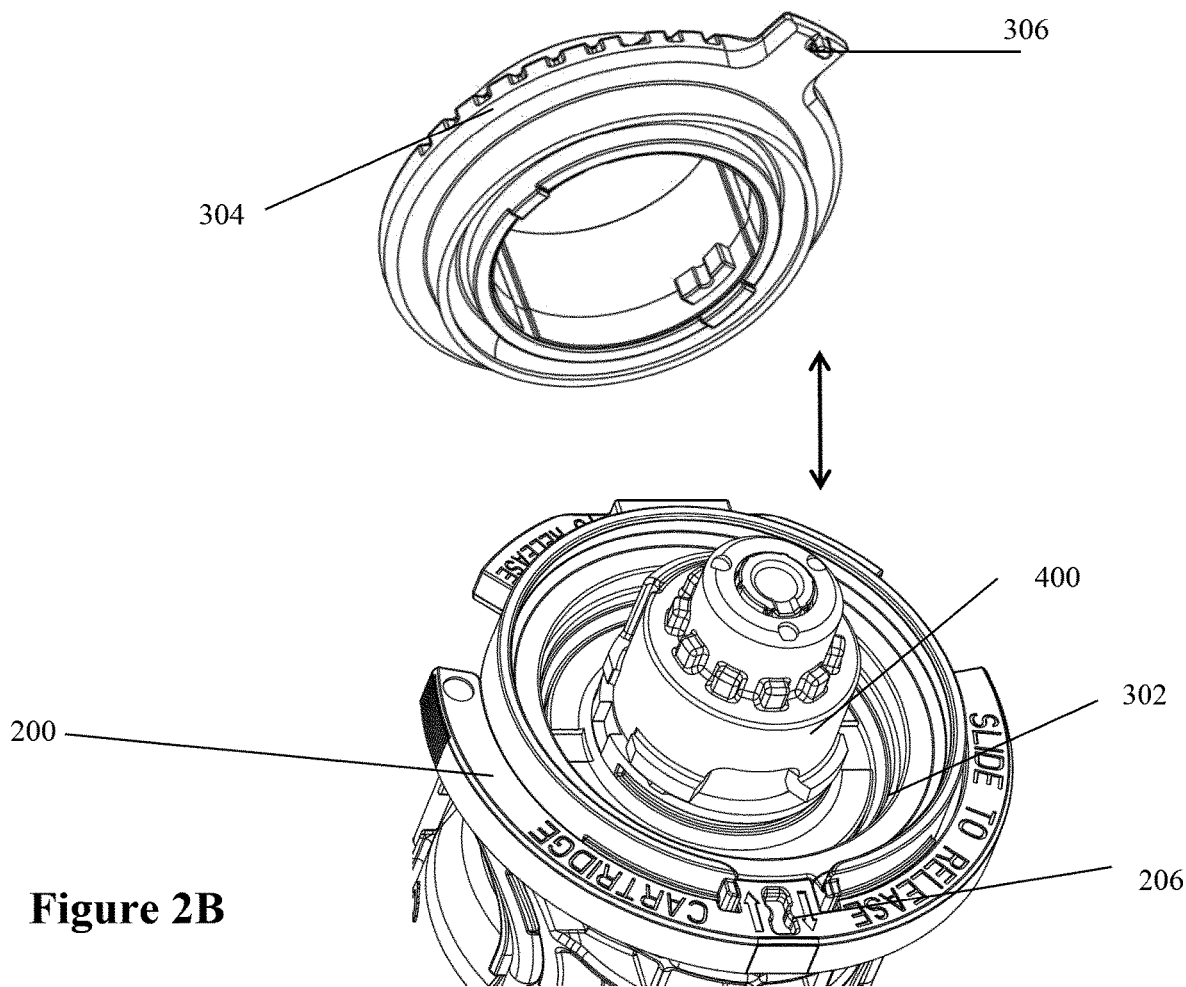
FIG. 2B shows the cartridge assembly with the cap removed.
Figure 3A:
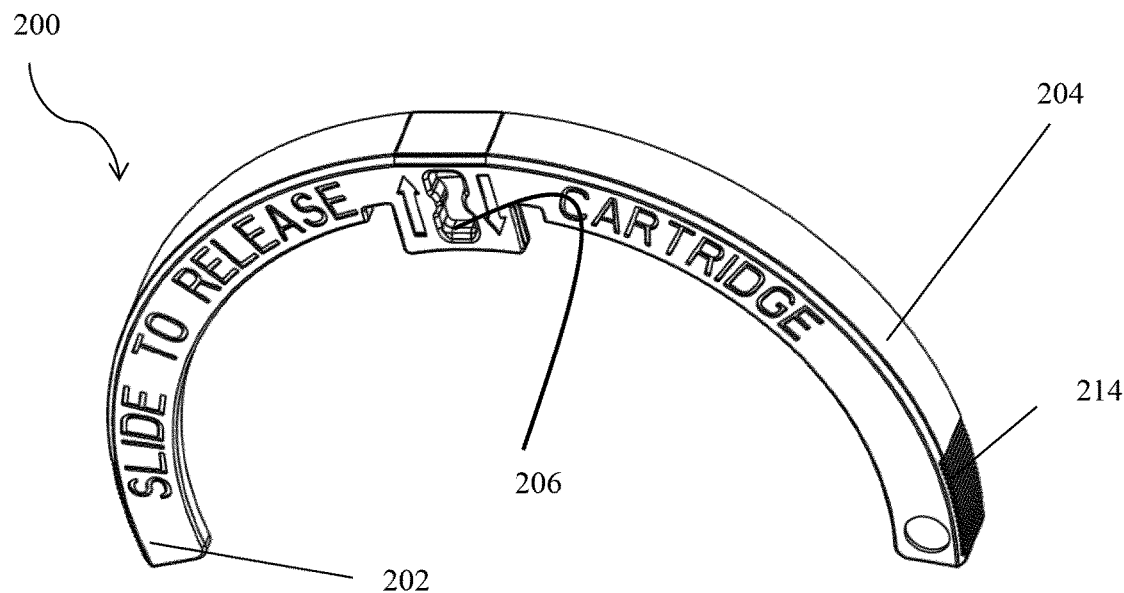
FIGS. 3A and 3B show the upper and lower sides, respectively and in the orientation shown in the preceding Figures, of the snap ring.
Figure 3B:
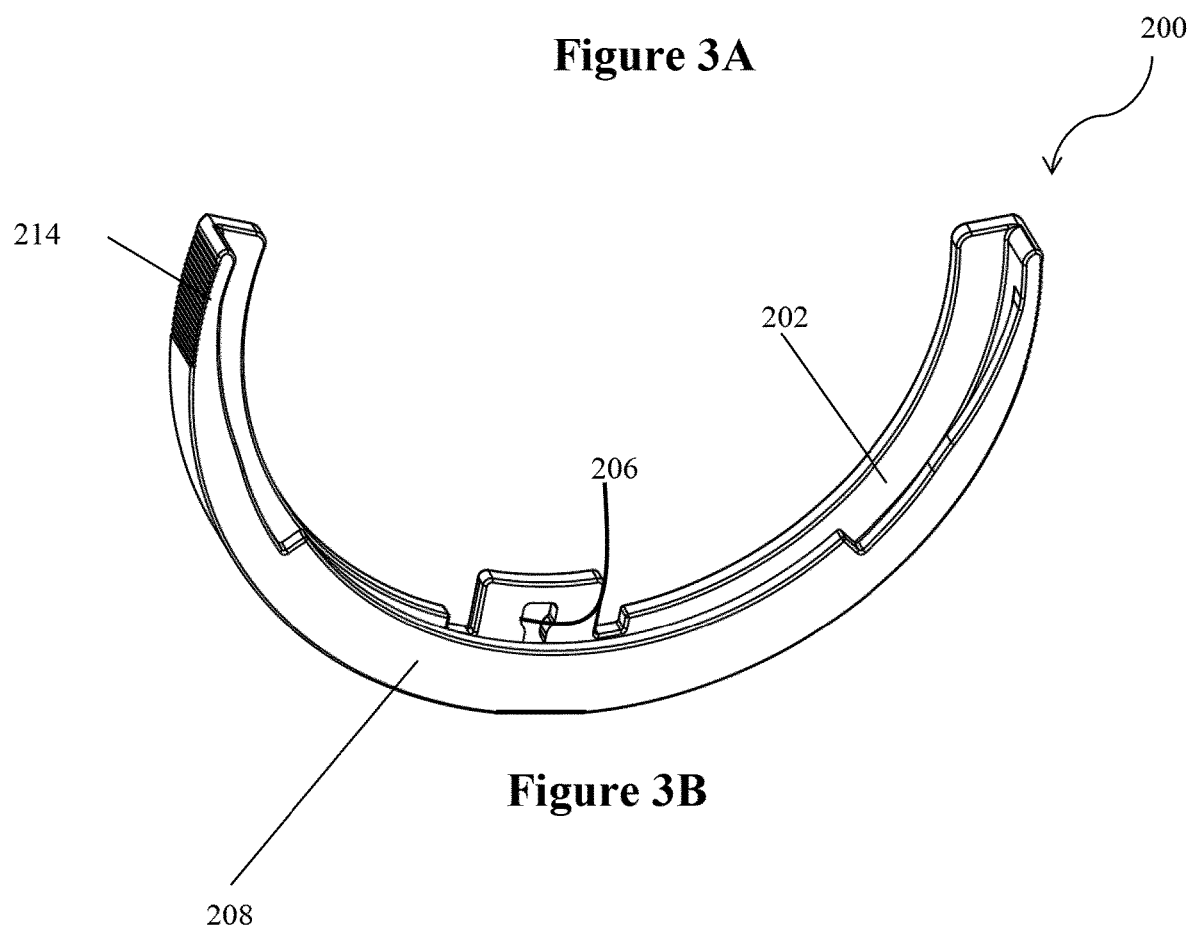

In the embodiment being described, the snap ring 200 is substantially C-shaped in top plan view (in the orientation shown in FIGS. 1B-1C). In the embodiment being described, a first elongate surface 204 at least substantially parallel to the surface of the body 102 forms the arc of the snap ring 200 (the vertical surface in the orientation shown in FIGS. 1B and 1C). In this embodiment, a second elongate surface 202 (the upper surface in the orientation shown) extends along a first side of the first elongate surface 204 and at least substantially perpendicular to it. The first and second elongate surfaces form a shape at least substantially L-shaped in cross-section.

In this embodiment, the one or more lugs 208 extend from a second side (the lower side in the orientation shown) of the first elongate surface 204. The lugs 208 are at least substantially perpendicular to the first elongate surface 204, and at least substantially parallel to the second elongate surface 202.

In the embodiment being described, the lugs 208 are provided by a third elongate surface 208 extending along the second side of the first elongate surface 204 and at least substantially perpendicular thereto, and at least substantially parallel to the second elongate surface 202. The lugs 208 extend inwardly with respect to the tap body 102 in the embodiment being described.

In the embodiment being described, the third elongate surface 208 narrows in width towards the ends of the snap ring 200 such that the snap ring 200 is substantially U-shaped in cross-section away from the ends of the snap ring and substantially L-shaped in cross-section towards the ends of the snap ring 200. In the embodiment being described, the width of the third elongate surface 208 is substantially constant in a middle portion of the snap ring 200, decreases in a discrete step around half way from the middle to the ends, and then gradually reduces towards the ends. The skilled person will appreciate that the number, width and shape of lugs 208 may be varied, for example according to the lugs 102a of the body 102.

The snap ring 200 has an indexing means 206 arranged to engage with a second indexing means 306 so as to allow the snap ring 200 to be moveable between the first and second positions. In various embodiments, the second indexing means may be provided by the body 102 or the cartridge assembly.

In the embodiment being described, the indexing means 206 of the snap ring 200 (i.e. the first indexing means) is a groove 206 in the upper surface 202 of the snap ring 200. The groove 206 passes all the way through the snap ring 200 in the embodiment being described, but may be blind in other embodiments.

In the embodiment being described, the groove 206 is located in a middle portion of the snap ring 200. In the embodiment being described, the upper surface 202 is wider in the region of the groove 206. The skilled person will appreciate that surface shape and groove position may vary in other embodiments.

In the embodiment being described, the groove 206 is oriented radially with respect to the body 102 so as to allow the snap ring 200 to slide in a radial direction.

In the embodiment being described, the groove 206 has a narrower central segment and a wider end segment at each end.

In the embodiment being described, the second indexing means is a protrusion 306, in this case the protrusion is shaped like a pin 306.

The groove 206 is arranged to receive the protrusion 306. The snap ring 200 is in the first position when the protrusion 306 is in a first end segment of the groove 206, and in the second position when the protrusion is in a second end segment of the groove 206.

In the embodiment being described, the protrusion 306 is a tighter fit within the narrower central segment of the groove 206. In this embodiment, the central segment of the groove 206 is shaped such that it is narrowest in the middle and wider towards the ends so as to bias the protrusion 306 towards whichever end is closest; i.e. towards the first or second position.

The skilled person would appreciate that the protrusion 306 may be located on the snap ring 200 instead of the groove 206 being located on the snap ring 200 in other embodiments. Further, the second indexing means 306 may be provided on the body 102 instead of on the cartridge assembly, or may be provided by a combination of the body 102 and the cartridge assembly.

The cap 304, which may be a welded cap, is fixedly connected to the cartridge housing in use and may be considered to be a part of the cartridge housing. The skilled person would appreciate that the second indexing means 306 may be provided by a part of the welded cap 304, as well as or instead of a part of another portion of the cartridge housing, arranged to interact with the first indexing means on the snap ring 200.

Additionally or alternatively, different indexing means known in the art may be used.

In the embodiment being described, the second indexing means (the pin 306) is provided by the cap 304. The cap 304 has an outward radial protrusion from which the pin 306 protrudes downwardly in the embodiment being described. The skilled person will appreciate that other cap shapes and protrusion positions may be used provided that the first and second indexing means 206, 306 are able to interengage.

In the embodiment being described, the snap ring 200 is retained on the cartridge assembly 400, 302, 304 in both the first and second positions. The cartridge assembly and snap ring can therefore be removed from the body 102, and reinserted into the body 102 (e.g. after servicing) as a single unit.

In the embodiment being described, the protrusion 306 has a stem and a head, the head being wider than the stem. The stem is sized to fit comfortably within the wider end segments of the groove 206 and tightly within the narrower central section. The head is sized and/or shaped to not fit through the narrower central section and to be a snap fit through the wider end segments such that the protrusion 306 is unlikely to escape from the groove 206 by accident. In the embodiment being described, the protrusion is a pin 306 with a bulbous head. The skilled person will appreciate that other shapes and designs may be used in other embodiments.

In the embodiments being described, the snap ring 200 is retained on either the body 102 or the cartridge assembly in both the first position and the second position. Advantageously, the risk of the snap ring 200 being lost may therefore be low. Further, ease of fitting of the snap ring 200 may be increased as compared to prior art apparatus.

Figure 6:
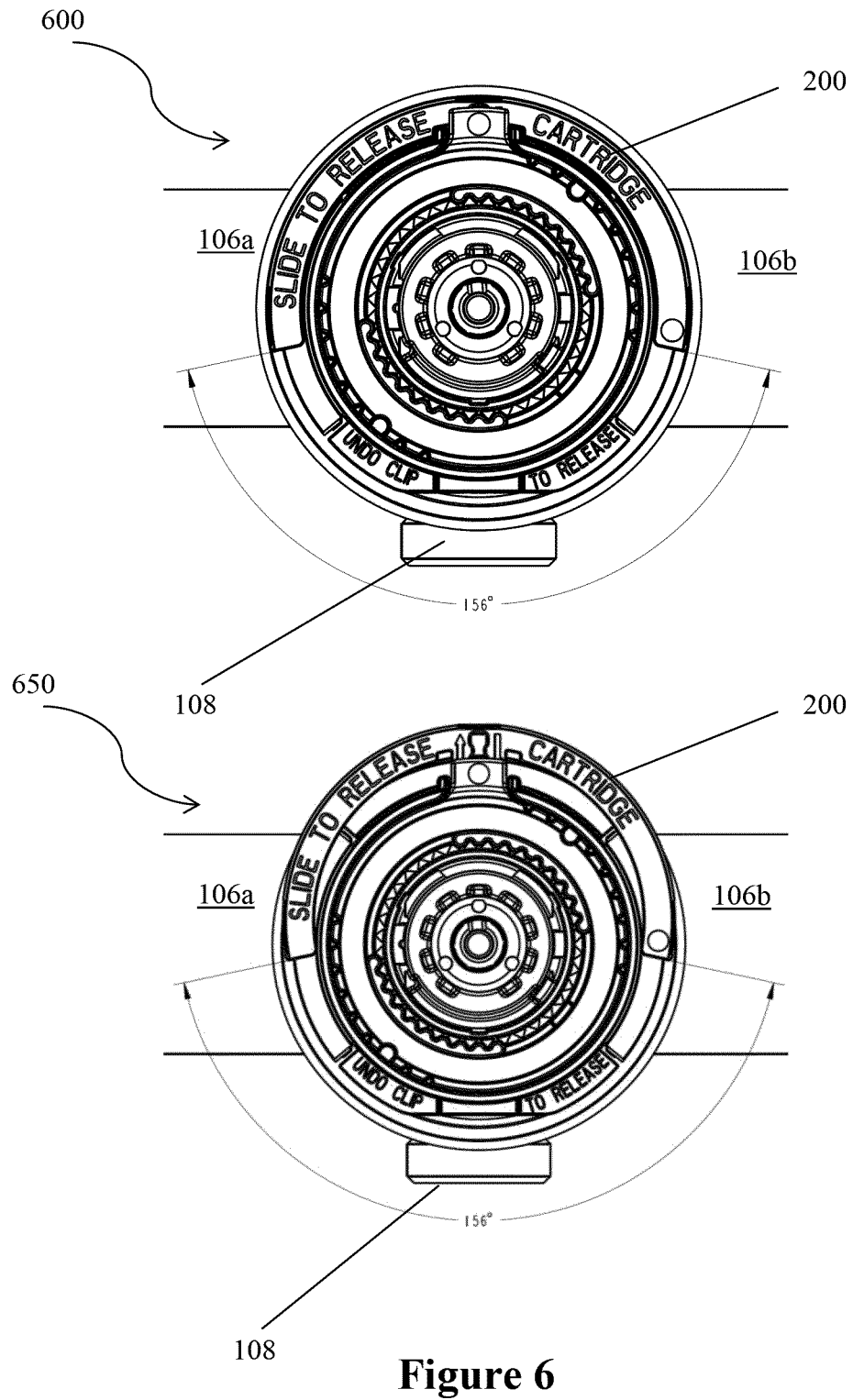
FIG. 6 shows plan views of the snap ring and cartridge assembly in retained and released positions, for a snap ring with a 156° opening angle.
Figure 7:
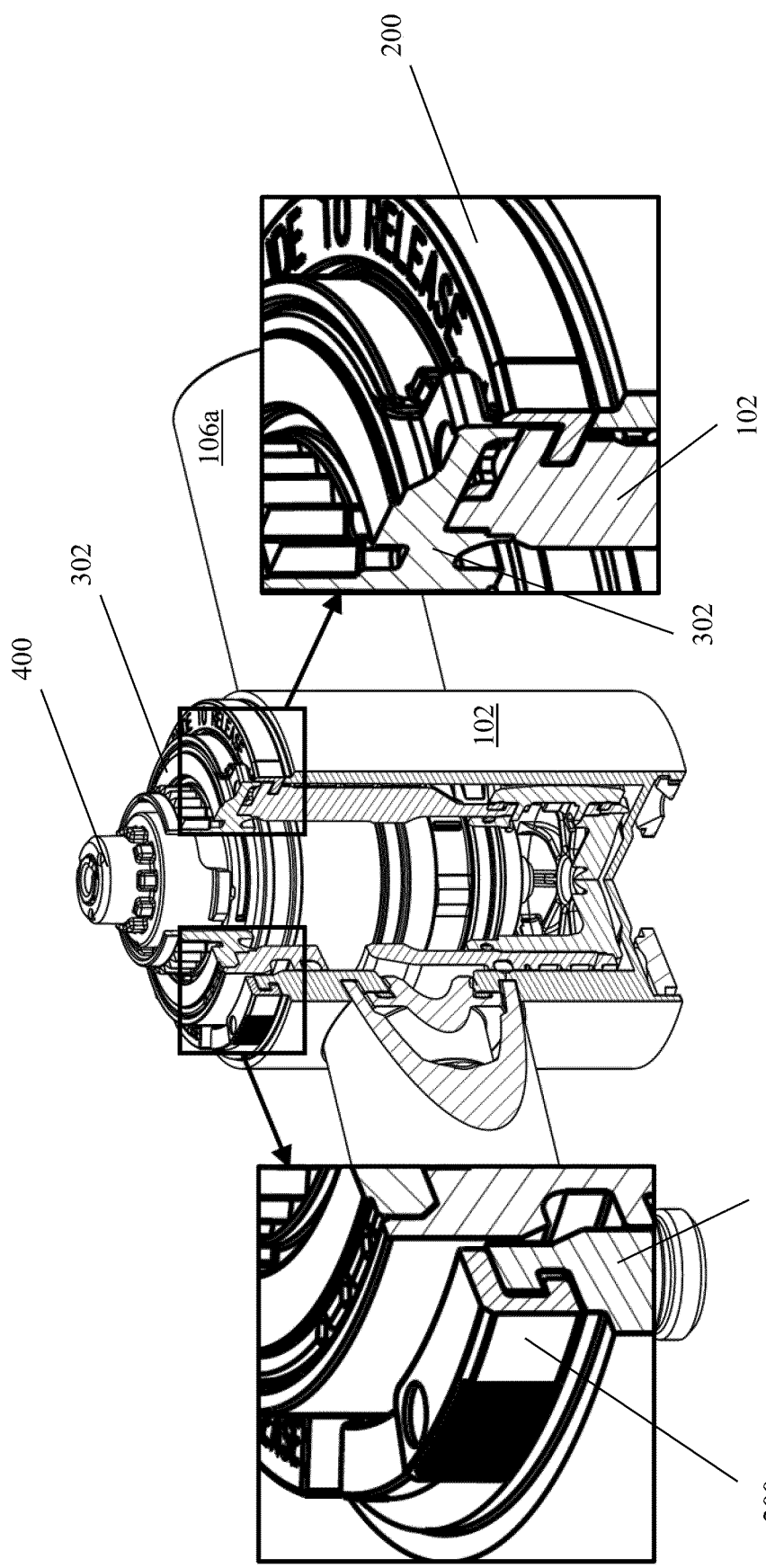
FIG. 7 shows a cut-away view of the cartridge assembly in a retained position within the tap body.
Figure 8:
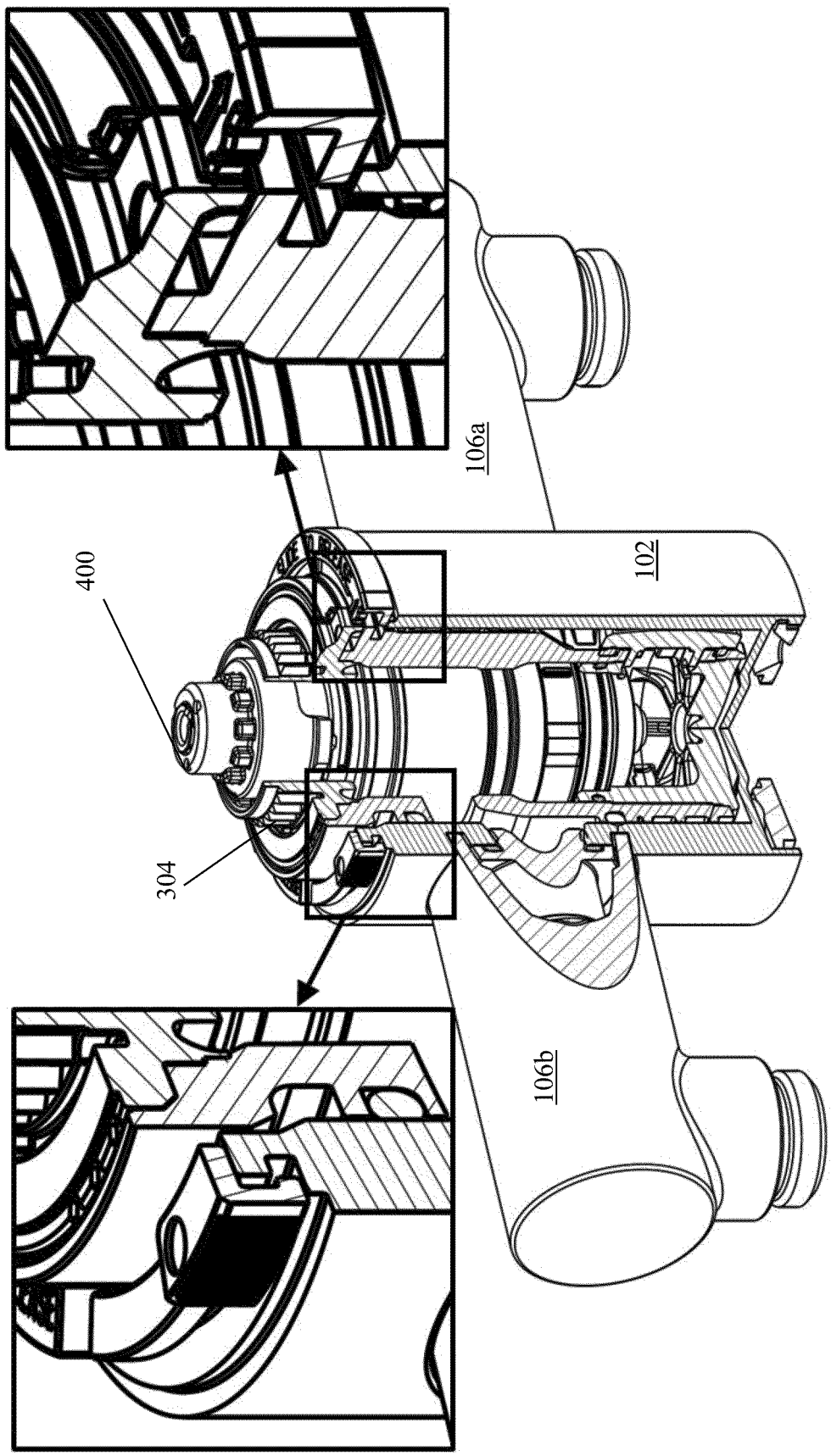
FIG. 8 shows a cut-away view of the cartridge assembly in a released position within the tap body.

The opening angle of the snap ring 200—i.e. the angle from one end of the snap ring 200 to a center point of the body to the other end of the snap ring 200 as marked in FIGS. 6 and 12—is between 130° and 300°.

In the embodiment being described, the opening angle is 156% as shown in FIG. 6. The angle is measured in the first, retained, position 600. When the snap ring 200 is moved into the second position 650, the ends of the snap ring 200 may be forced further apart, temporarily changing the angle (adjusted angle not shown).

Figures 12A, 12B:
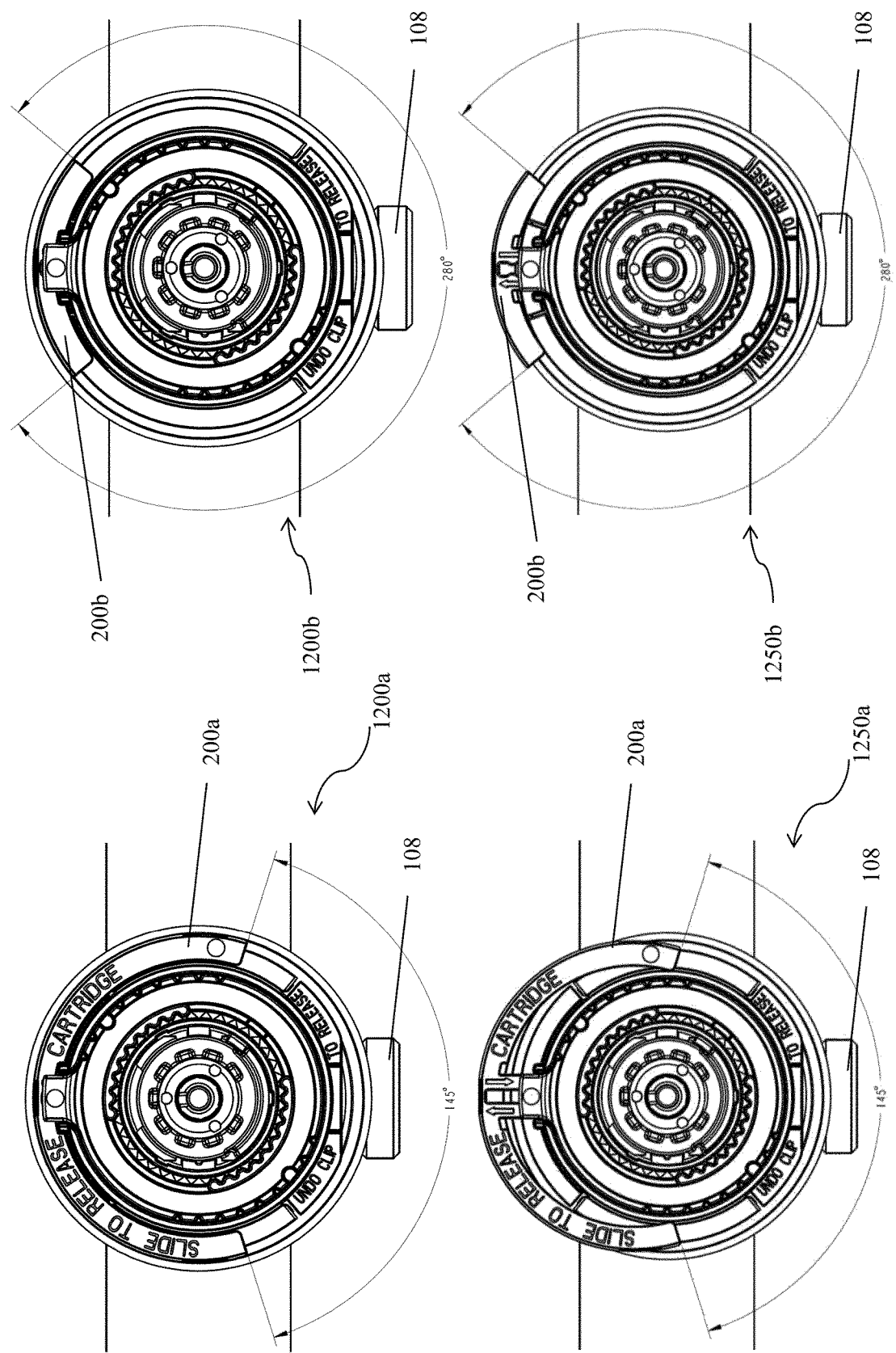
FIGS. 12A and 12B show plan views of the snap ring and cartridge assembly in retained and released positions, for a snap ring with a 145* opening angle and a 280* opening angle, respectively.

In alternative embodiments, such as those shown in FIGS. 12A and 12B, the opening angles may be different. For example, an alternative snap ring 200*a* has an opening angle of 145° and a further alternative snap ring 200*b* has an opening angle of 280°.

In FIG. 12A, it can be seen that, in the first position 1200*a*, the shape and resilience of the snap ring 200*a* can retain the snap ring 200*a* on the cartridge assembly.

In the second position 1250*a*, the ends of the snap ring 200*a* are further apart but the spacing between them is still slightly smaller than the diameter of the cartridge assembly. The shape and resilience of the snap ring 200*a* can therefore also retain the snap ring 200*a* on the cartridge assembly in the second position.

As such, the skilled person will appreciate that, in embodiments with an opening angle less than 180*, and which remains less than 180° in the second position, use of the indexing means 206, 306 or other attachment means to retain the snap ring 200*a* on the cartridge assembly may not be necessary.

In FIG. 12B, it can be seen that, in the first position 1200*b* and second position 1250*b*, the shape and resilience of the snap ring 200*b* are not enough to retain the snap ring 200*b* on the cartridge assembly. Another attachment means, such as the protrusion 306 and groove 206 described above, is therefore used. The skilled person will appreciate that the additional attachment means may be a separate element or a shape feature of one or more of the elements described above.

Figure 14:
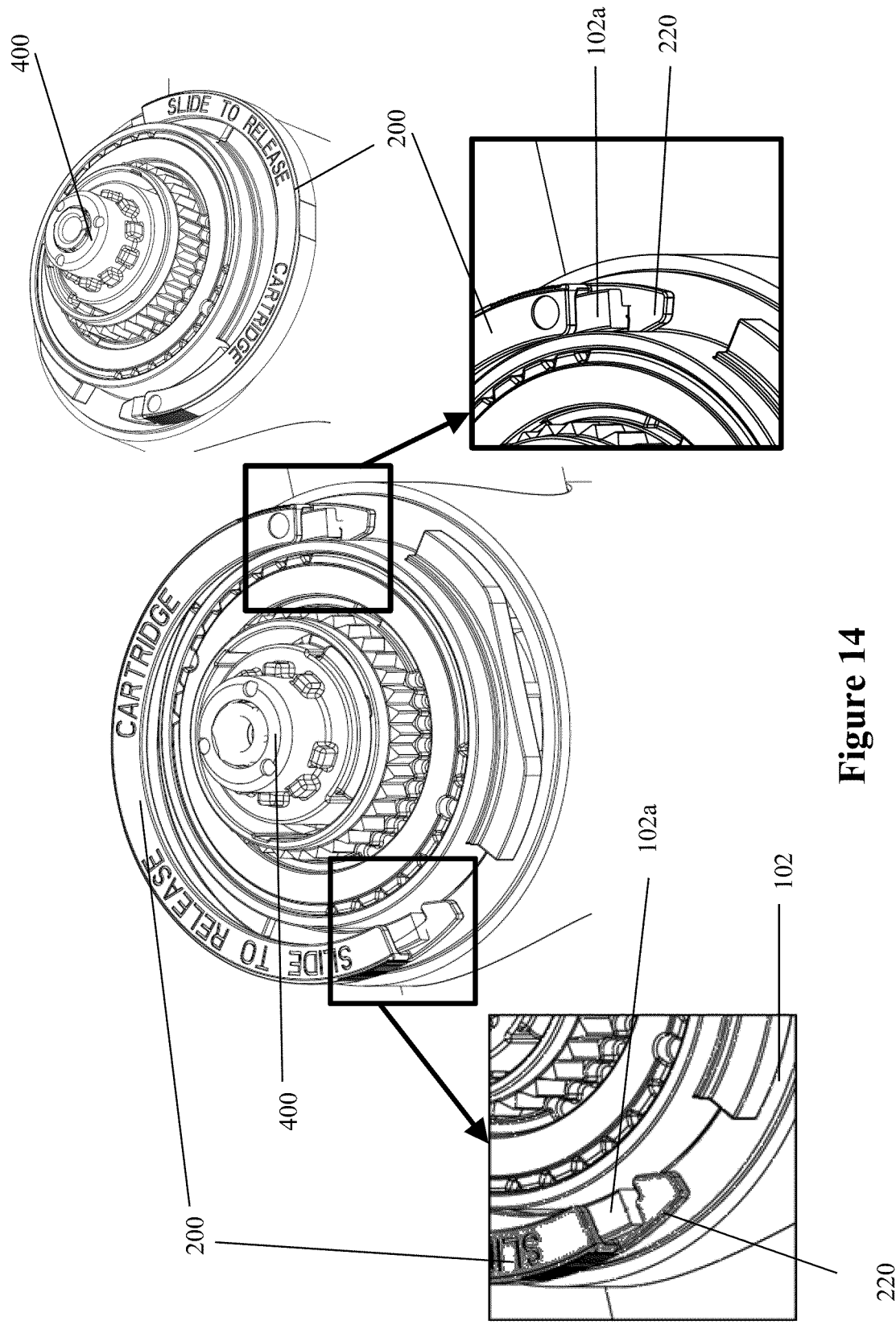
FIG. 14 shows a retaining means of an embodiment comprising clip features, in a released position.
Figure 15:
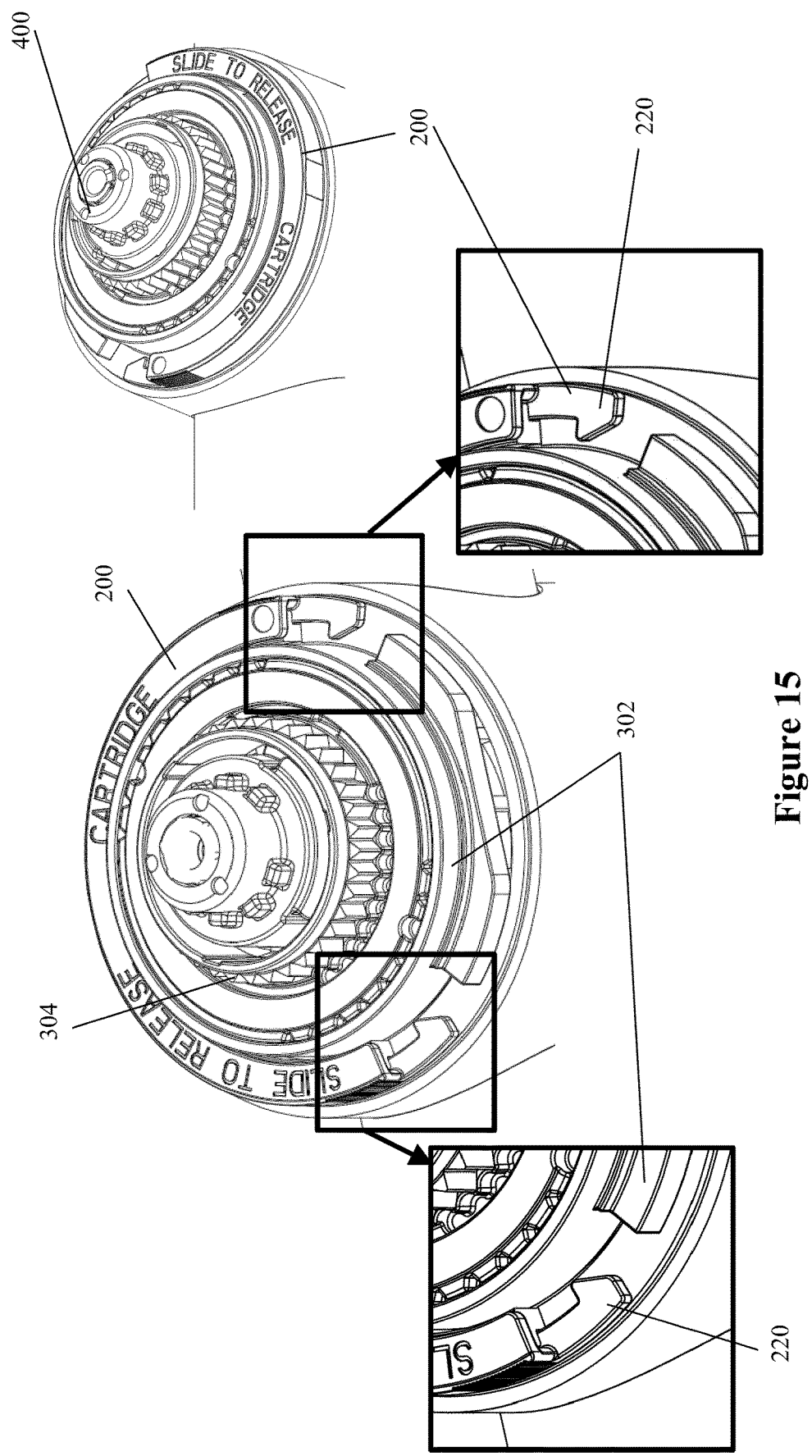
FIG. 15 shows a retaining means of an embodiment comprising clip features, in a retained position.

In some embodiments, such as those shown in FIG. 14 and FIG. 15, the attachment means may secure the snap ring 200 to the tap body 102 instead of to the cartridge assembly.

In the embodiment shown in FIGS. 14 and 15, each end region 220 of the snap ring 200 is shaped to act as a clip. Each clip 220 is arranged to engagingly interact with the lugs 102*a* on the body 102.

Figure 9:
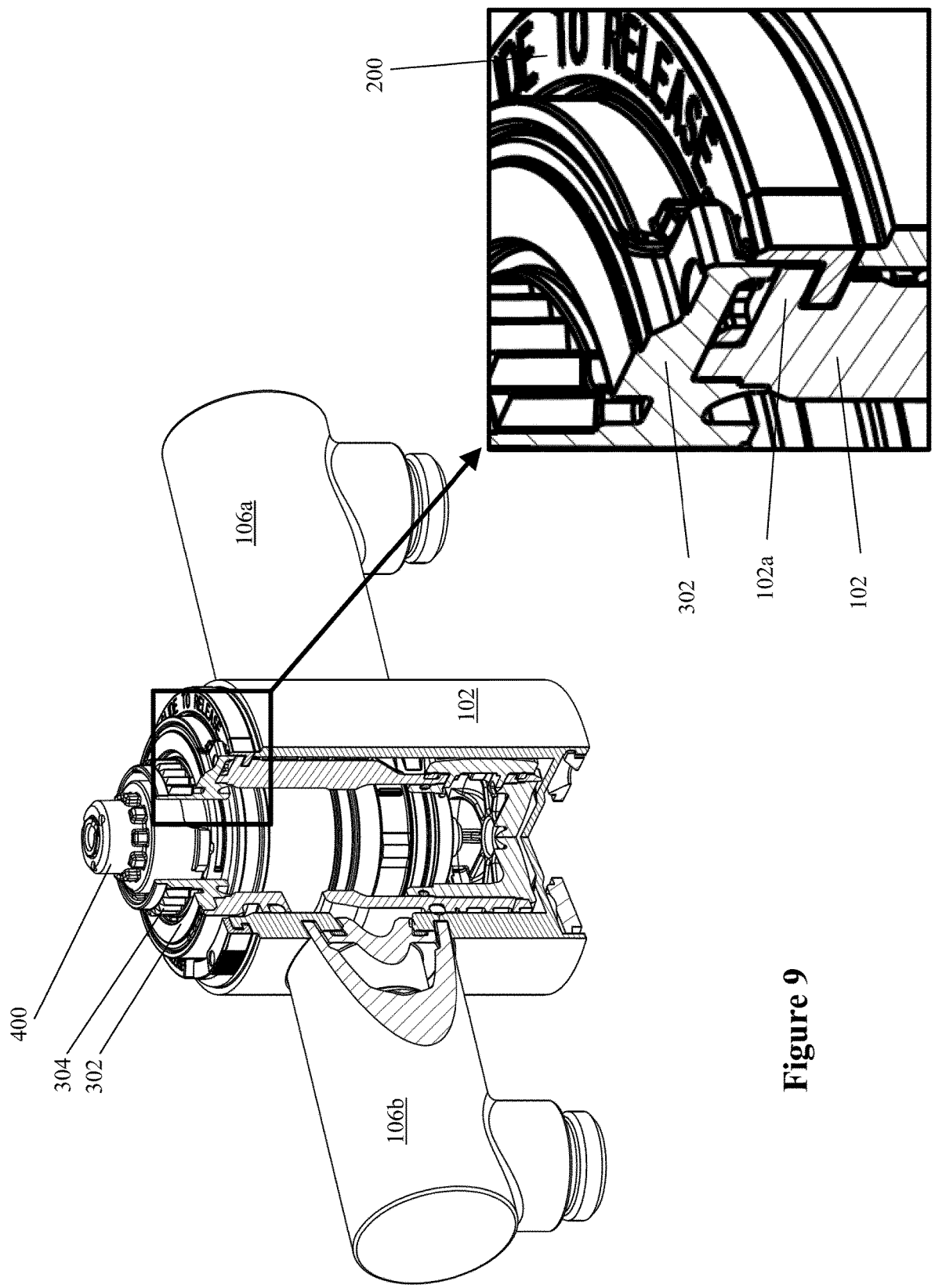
FIG. 9 shows a cut-away view of the cartridge assembly in a retained position within the tap body.
Figure 10A:
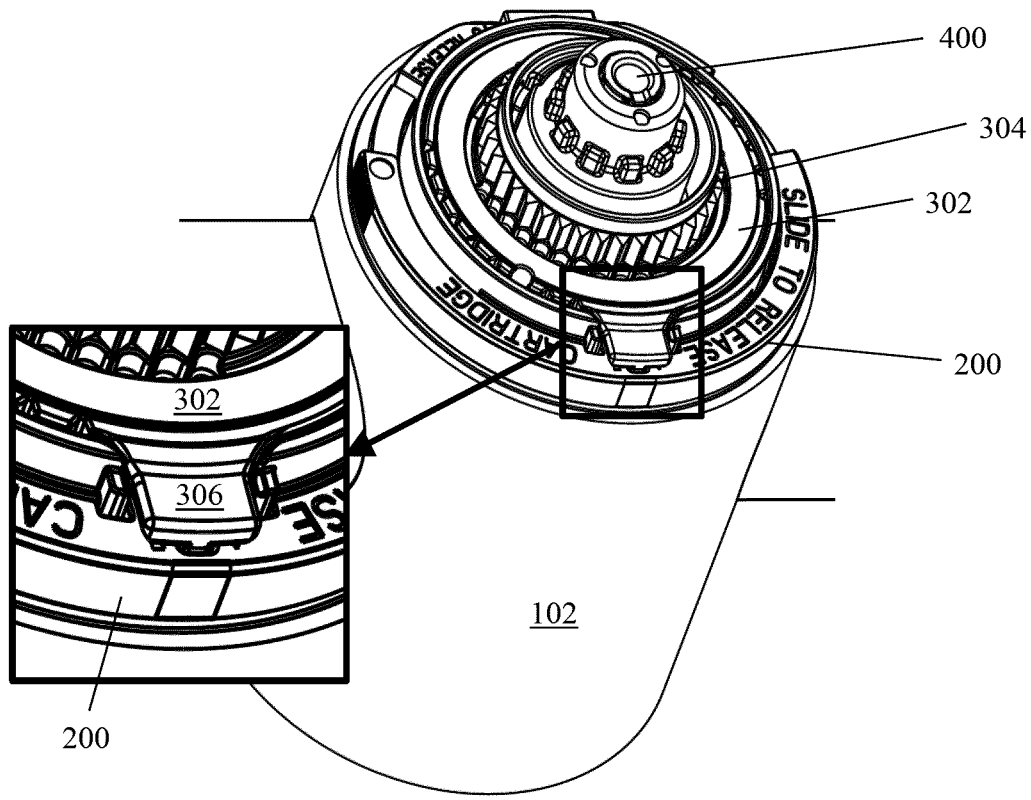
FIGS. 10A and 10B show the indexing means and lugs with the cartridge assembly in a retained position within the tap body.
Figure 10B:
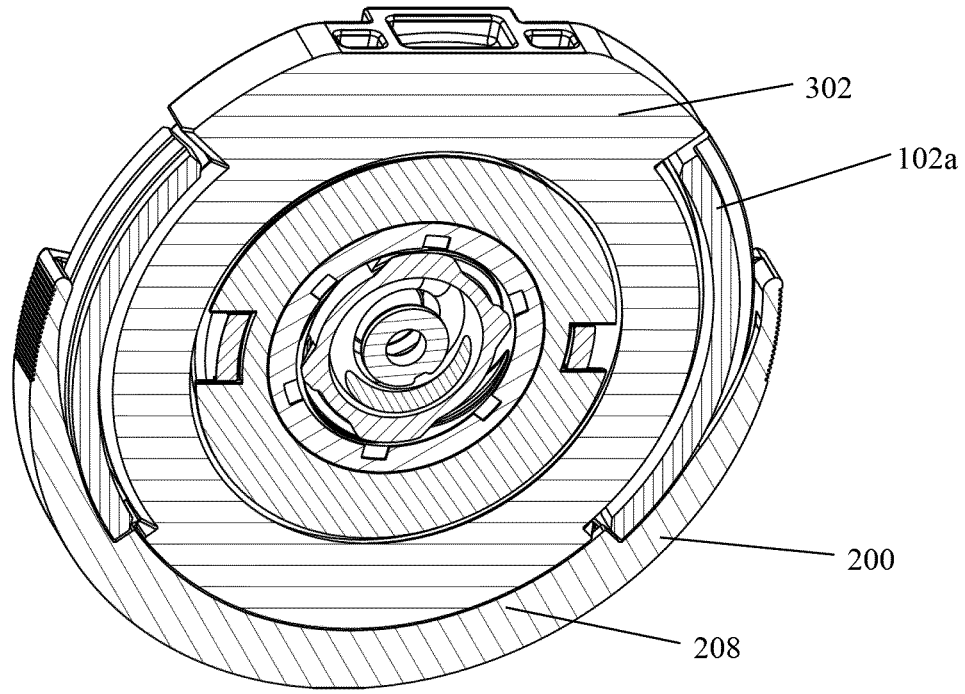
Figure 11A:
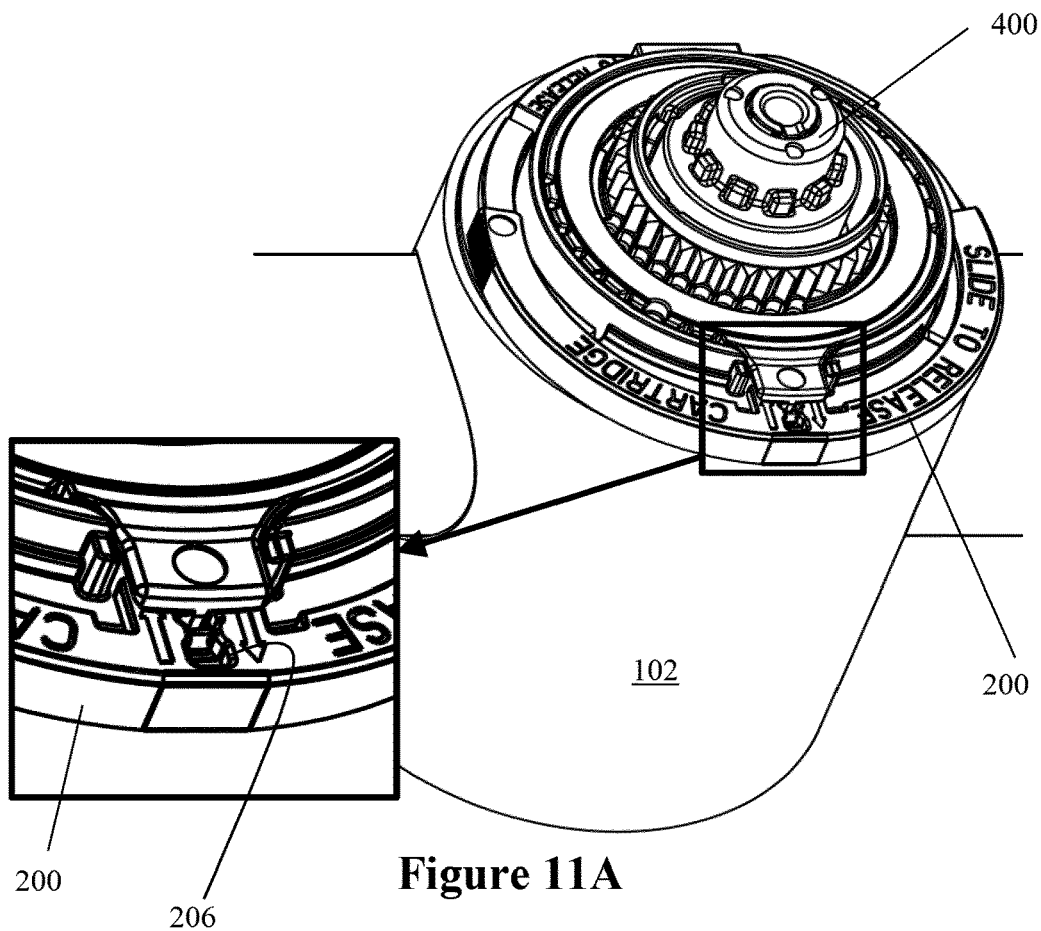
FIGS. 11A and 11B show the indexing means and lugs with the cartridge assembly in a released position within the tap body.
Figure 11B:
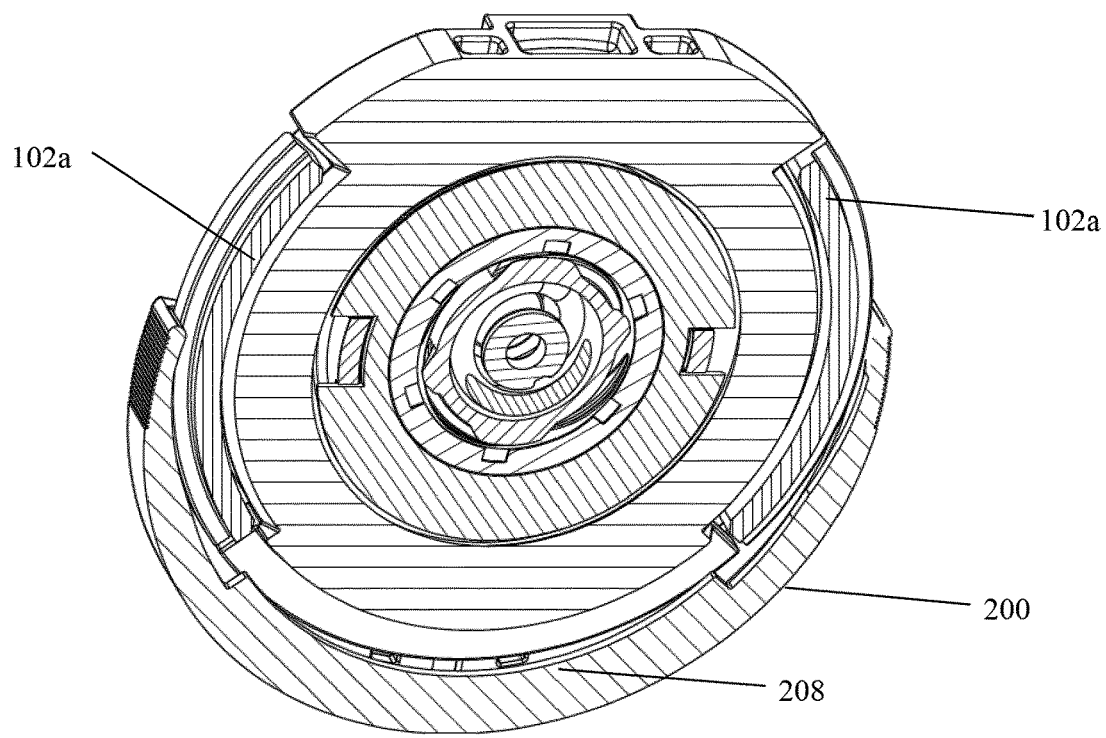

In the embodiment shown in FIGS. 14 and 15, the clips 220 prevent the snap ring 200 from being pulled away from the body 102 by more than a set distance. The set distance is controlled by the distance between a beak of the clip 220 and the end of the L-shaped lug 102*a* (see FIG. 9 for a cross-sectional view of this lug) when the snap ring 200 is in the first position (see FIG. 15). When a user slides the snap ring 200 away from the body 102, the snap ring 200 moves until the beak of each clip 220 makes contact with the lug 102*a*—the contact between the clip 220 and the lug 102*a* prevents further motion of the snap ring 200, so holding the clip 200 in the second position (see FIG. 14).

In the embodiment shown in FIGS. 14 and 15, no groove 206 is provided on the snap ring. In alternative embodiments, the groove 206 and protrusion 306 may be used in addition to clips 220.

In the embodiment being described, the snap ring 200 is provided with grips 214. In the embodiment being described, the grips 214 take the form of raised protrusions on an outer surface of the snap ring 200. In the embodiment being described, the grips 214 are located in end regions of the snap ring 200.

Figure 16:
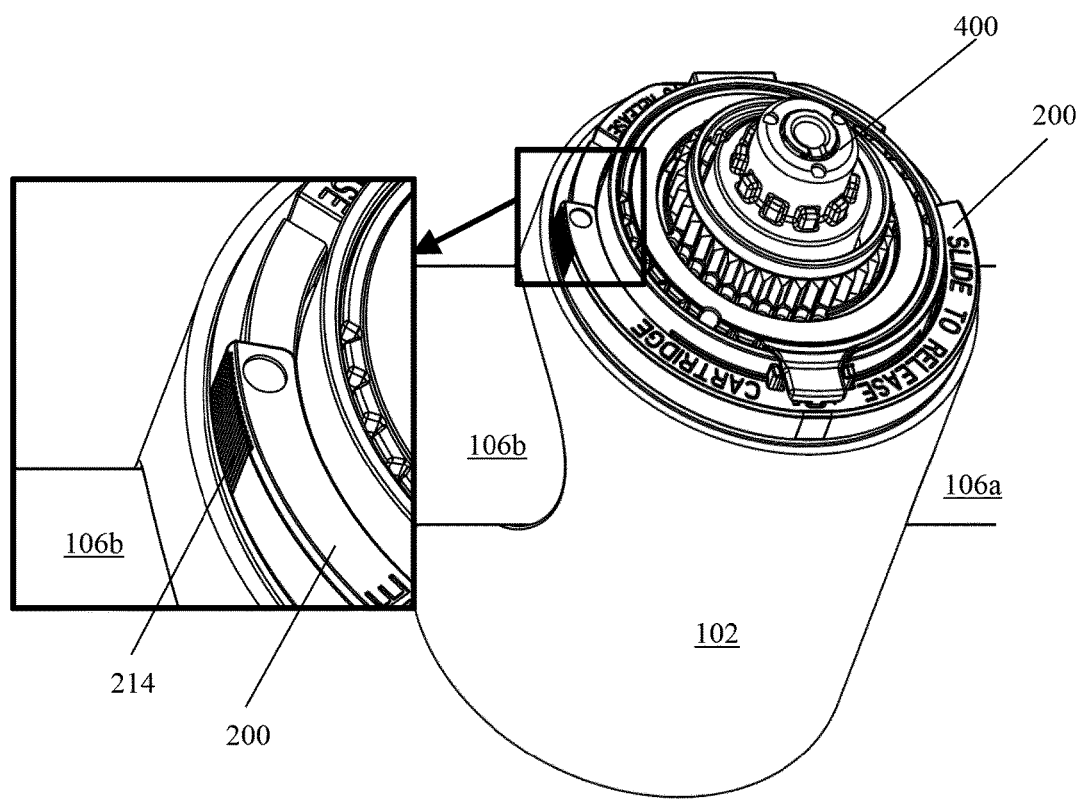
FIG. 16 shows an enlarged view of grips provided on a snap ring of an embodiment.
Figure 17:
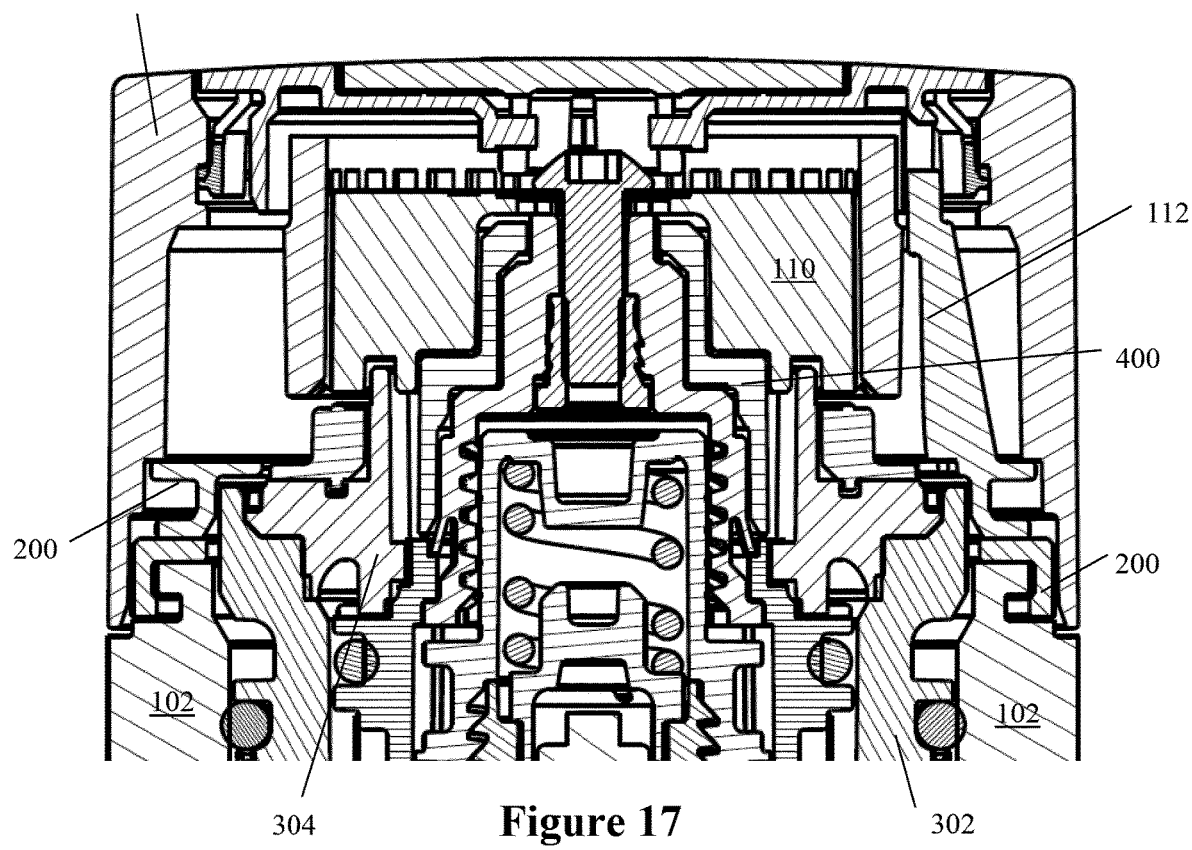
FIG. 17 shows a cross-sectional view of the tap body.

More specifically, in the example shown in FIG. 16, the grips 214 take the form of two sets of parallel, vertical lines on the snap ring 200, one set at each end of the snap ring 200.

The skilled person will appreciate that any other known grip design may be used. Indentations may be used instead of or as well as projections, and/or portions of a different material may be used, e.g. rubber. The grips 214 may facilitate manual sliding of the snap ring 200 by increasing friction between a user's hand and the snap ring 200. Additionally, the presence of grips 214 may highlight that the snap ring 200 is arranged to be operated manually.

In the embodiment being described, to remove the cartridge assembly 302, 304, 400 from the body 102, the snap ring 200 is slid away from the cartridge assembly (horizontally in the orientation shown in the figures) and the cartridge assembly is then slid out of the body 102 (vertically in the orientation shown in the figures).

In the embodiment being described, the cartridge assembly 302, 304, 400 is a relatively tight fit within the body 102, and some force is needed to slide the cartridge assembly. In particular, a screwdriver or the likes can be used to lever out the cartridge assembly.

In the embodiment being described, an indentation 305 on the housing 302 may be used to engage the head of the screwdriver (or equivalent) so as to provide grip.

In the embodiment being described, one or more ribs 307 on the housing 302 may be used to engage the head of the screwdriver (or equivalent) so as to provide grip, once the ribs 307 are exposed by movement of the cartridge assembly 302, 304, 400 with respect to the body 102.

In the embodiment being described, the snap ring 200 is arranged to be highly visible. Colors may be used to facilitate identification and use of the snap ring 200 and/or manufacture of the apparatus. For example, the snap ring 200 may be colored to be distinctive from the housing 305, body 102, and/or cap 304, for example being brightly colored or colored in a contrasting color from the adjacent parts. For example, the snap ring 200 may be a bright blue. In alternative or additional embodiments, the snap ring 200 may be yellow, pink, orange, purple, green, or any other color or combination of colors.

The color(s) may be used to distinguish which assembly line (and therefore which shower product) the snap rings 200 are intended to go into—thereby making organization on the assembly lines slightly easier/more visual.

In some embodiments, a camera may be used on an assembly line to check the presence of components. Therefore coloring the components differently may facilitate distinguishing between the components by the camera.

Advantageously, the coloring may also assist a user in determining how to release the cartridge 400; this may be particularly beneficial if the user is not familiar with the design disclosed herein. The use of a bright color may also facilitate reference to the color in a user installation guide—for example instructing the user to "slide back the blue snap ring to release the cartridge assembly".

In addition, the cap 304 may be a contrasting color from the housing 302, for example being black.

The skilled person will appreciate that parts arranged to be in contact with water are usually supplied in black or natural colors as they are colors which are Water Regulations Advisory Scheme (WRAS) approved. However, another color could be used in some embodiments.

In the embodiment being described, the temperature stop 114 (which may also be referred to as a temperature trim) is red—this is the component used to adjust the maximum temperature. Red is commonly used in the field for parts associated with temperature, but the skilled person would appreciate that other colors may be used in other embodiments.

Additionally the handle drive, or hub, 110 is yellow in the embodiment being described. In alternative embodiments, hubs 110 of this type may be provided in purple, blue, white etc., or any other desired color. Again, use of a contrasting color this allows to which assembly line a part belongs to be quickly identified without reading associated paperwork.

Furthermore the yellow hub 110, red temperature trim 114, and black cartridge assembly components may allow a camera to check the presence of the components more easily as a result of the contrasting colors.

What is claimed is:

1. A retaining means for retaining a cartridge on a body, the retaining means comprising:
    a snap ring having an opening angle of between 130° and 300°, and comprising a first indexing means, the snap ring being arranged to be slideable between a first position with respect to the body in which the retaining means retains the cartridge on the body and a second position with respect to the body in which the cartridge can be removed from the body; and
    a cap arranged to be fixedly connected to a housing of the cartridge, and comprising a second indexing means;
    wherein the first indexing means is arranged to interlock with the second indexing means so as to allow the snap ring to be moved between, and held in each of, the first and second positions.

2. The retaining means of claim 1, wherein the snap ring has a curved shape so as to form an arc of a circle.

3. The retaining means of claim 1, wherein the snap ring has an opening angle of between 150° and 160°.

4. The retaining means of claim 1, wherein the snap ring is arranged to be held on a cartridge assembly in both the first position and the second position, the cartridge assembly being arranged to contain the cartridge.

5. The retaining means of claim 4, wherein each end region of the snap ring is biased towards the cartridge assembly, and wherein the snap ring is arranged to be held onto the cartridge assembly by the end regions of the snap ring in both the first position and the second position.

6. The retaining means of claim 5, wherein the opening angle is less than 180°.

7. The retaining means of claim 1, wherein the first and second indexing means comprise:
    (i) a protrusion; and
    (ii) a groove arranged to receive the protrusion, the groove having a narrower central segment and wider end segments, the groove being oriented radially with respect to the body;
    wherein the snap ring is in the first position when the protrusion is in a first end segment of the end segments, and in the second position when the protrusion is in a second end segment of the end segments.

8. The retaining means of claim 7, wherein the protrusion is provided by the cap mounted on the cartridge housing and the groove is provided by the snap ring.

9. The retaining means of claim 7, wherein the groove is arranged to bias the protrusion towards the nearest end segment.

10. The retaining means of claim 1, wherein the opening angle is more than 180°.

11. The retaining means of claim 1, wherein the snap ring has lugs arranged to cooperate with lugs on the body such that in the first position the lugs on the snap ring engage the lugs on the body, and, when the snap ring is slid to the second position, the lugs of the snap ring release from the lugs on the body.

12. The retaining means of claim 1, wherein the snap ring is arranged to slide in a radial direction between the first position and the second position.

13. The retaining means of claim 1, wherein end regions of the snap ring have grips provided on their outer surfaces, the grips being arranged to facilitate manual sliding of the snap ring between the first and second positions.

14. The retaining means of claim 1, wherein the snap ring comprises:
    a first elongate surface forming an arc of the snap ring;
    a second elongate surface extending along a first side of the first elongate surface and at least substantially perpendicular thereto such that the first and second elongate surfaces form a shape at least substantially L-shaped in cross-section; and
    one or more lugs extending from a second side of the first elongate surface and at least substantially perpendicular thereto, and at least substantially parallel to the second elongate surface, wherein the one or more lugs of the snap ring are arranged to engagingly interact with lugs on the body in the first position, and to be free of the lugs of the body in the second position.

15. The retaining means of claim 14, wherein the lugs are provided by a third elongate surface extending along the second side of the first elongate surface and at least substantially perpendicular thereto, and at least substantially parallel to the second elongate surface.

16. The retaining means of claim 15, wherein the third elongate surface narrows in width towards the ends of the snap ring such that the snap-ring is substantially U-shaped in cross-section away from the ends of the snap ring and substantially L-shaped in cross-section towards the ends of the snap ring.

17. The retaining means of claim 15 wherein the width of the third elongate surface narrows in discrete step.

18. A valve cartridge assembly comprising:
    a cartridge; and
    a retaining means retaining the cartridge to a body; and
    wherein the retaining means comprises:
        a snap ring having an opening angle of between 130° and 300°, and comprising a first indexing means, the snap ring being arranged to be slideable between a first position with respect to the body in which the retaining means retains the cartridge on the body and a second position with respect to the body in which the cartridge can be removed from the body; and
        a cap arranged to be fixedly connected to a housing of the cartridge, and comprising a second indexing means;
        wherein the first indexing means is arranged to interlock with the second indexing means so as to allow the snap ring to be moved between, and held in each of, the first and second positions.

19. A faucet comprising:
    a faucet body; and
    at least one valve cartridge assembly comprising a cartridge and a retaining means retaining the cartridge to the faucet body;
    wherein the retaining means comprises:
        a snap ring having an opening angle of between 130° and 300°, and comprising a first indexing means, the snap ring being arranged to be slideable between a first position with respect to the faucet body in which the retaining means retains the cartridge on the faucet body and a second position with respect to the faucet body in which the cartridge can be removed from the faucet body; and a cap arranged to be fixedly connected to a housing of the cartridge, and comprising a second indexing means;

wherein the first indexing means is arranged to interlock with the second indexing means so as to allow the snap ring to be moved between, and held in each of, the first and second positions.

* * * * *